(12) United States Patent
Takazakura et al.

(10) Patent No.: US 8,986,181 B2
(45) Date of Patent: Mar. 24, 2015

(54) MODULE FOR AUTOMATIC TOOL EXCHANGE DEVICE

(75) Inventors: Shuhei Takazakura, Otsu (JP); Atsushi Deguchi, Shima (JP); Shinya Sasaki, Tsu (JP); Toshikazu Mukai, Ise (JP); Tomimasa Yamashita, Suzuka (JP); Shinji Yahiro, Suzuka (JP); Atsushi Miyabe, Suzuka (JP); Keisuke Ayabe, Kameyama (JP); Takashi Fujimura, Utsunomiya (JP)

(73) Assignees: Mie Electronics Co., Ltd., Ise (JP); Honda Motor Co., Ltd., Tokyo (JP)

( * ) Notice: Subject to any disclaimer, the term of this patent is extended or adjusted under 35 U.S.C. 154(b) by 1006 days.

(21) Appl. No.: 13/054,724

(22) PCT Filed: Jul. 23, 2009

(86) PCT No.: PCT/JP2009/003477
§ 371 (c)(1),
(2), (4) Date: Jun. 9, 2011

(87) PCT Pub. No.: WO2010/013418
PCT Pub. Date: Feb. 4, 2010

(65) Prior Publication Data
US 2011/0256995 A1    Oct. 20, 2011

(30) Foreign Application Priority Data
Aug. 1, 2008  (JP) ................. 2008-200184

(51) Int. Cl.
*B23Q 3/155* (2006.01)
*B25J 15/04* (2006.01)
(Continued)

(52) U.S. Cl.
CPC .............. *B25J 15/04* (2013.01); *B25J 19/0029* (2013.01); *G08C 17/04* (2013.01)
USPC .......................................... 483/37

(58) Field of Classification Search
USPC ......................................... 307/104
See application file for complete search history.

(56) References Cited

U.S. PATENT DOCUMENTS 5,460,536 A    10/1995   Cullen
5,712,552 A    1/1998    Hirai et al.
(Continued)

FOREIGN PATENT DOCUMENTS

CN    1411960 A    4/2003
CN    101026033 A   8/2007
(Continued)

OTHER PUBLICATIONS

Nov. 20, 2012 Office Action issued in Japanese Application No. 2008-200184 (with partial translation).
(Continued)

*Primary Examiner* — Rexford Barnie
*Assistant Examiner* — Daniel Kessie
(74) *Attorney, Agent, or Firm* — Oliff PLC

(57) ABSTRACT

Provided is a module for automatic tool exchange device of novel structure wherein electric signals can be transmitted with high reliability while preventing transmission efficiency from deteriorating between a first coupling member and a second coupling member. An electromagnetic shielding member is arranged on an outer circumference of a core member except for a transmission surface, a gap member having electromagnetic shielding effect lower than that of the electromagnetic shielding member is interposed between the core member and the electromagnetic shielding member, and a first module and a second module are provided, respectively, with coil units equipped with coil heads which are constituted to include a coil member, the core member and the gap member.

41 Claims, 14 Drawing Sheets

(51) Int. Cl.
  *B25J 19/00*   (2006.01)
  *G08C 17/04*   (2006.01)

(56) References Cited

U.S. PATENT DOCUMENTS

| | | | | |
|---|---|---|---|---|
| 5,814,900 | A * | 9/1998 | Esser et al. | 307/104 |
| 6,491,612 | B1 * | 12/2002 | Kurup et al. | 483/16 |
| 7,197,113 | B1 | 3/2007 | Katcha et al. | |
| 7,986,139 | B2 * | 7/2011 | Goto | 324/207.25 |
| 8,166,844 | B2 * | 5/2012 | Nakajima | 74/490.01 |
| 2003/0085681 | A1 | 5/2003 | Sakamoto et al. | |
| 2003/0102862 | A1 * | 6/2003 | Goto et al. | 324/207.16 |
| 2007/0276538 | A1 | 11/2007 | Kjellsson et al. | |

FOREIGN PATENT DOCUMENTS

| | | |
|---|---|---|
| JP | U-62-36512 | 3/1987 |
| JP | U-62-049213 | 3/1987 |
| JP | A-2-292194 | 12/1990 |
| JP | A-5-154784 | 6/1993 |
| JP | A-06-140256 | 5/1994 |
| JP | A-7-100786 | 4/1995 |
| JP | A-09-330838 | 12/1997 |
| JP | A-11-354350 | 12/1999 |
| JP | A-2001-077733 | 3/2001 |
| JP | A-2002-231545 | 8/2002 |
| JP | A-2004-1177 | 1/2004 |
| JP | A-2006-15429 | 1/2006 |
| JP | A-2006-191098 | 7/2006 |
| JP | A-2007-514558 | 6/2007 |

OTHER PUBLICATIONS

International Search Report mailed Oct. 20, 2009 issued in international Patent Application No. PCT/JP2009/003477 (with translation).
Nov. 14, 2013 Office Action issued in Chinese Patent Application No. 200980130472.6 (with English translation).
International Preliminary Report on Patentability issued on Mar. 8, 2011 in International Patent Application No. PCT/JP2009/003477 (with translation).
Feb. 4, 2013 Office Action issued in Chinese Application No. 200980130472.6 (with partial translation).
Japanese Office Action issued in Application No. 2008-200184; Dated Jul. 10, 2013 (With Partial English-language translation).

* cited by examiner

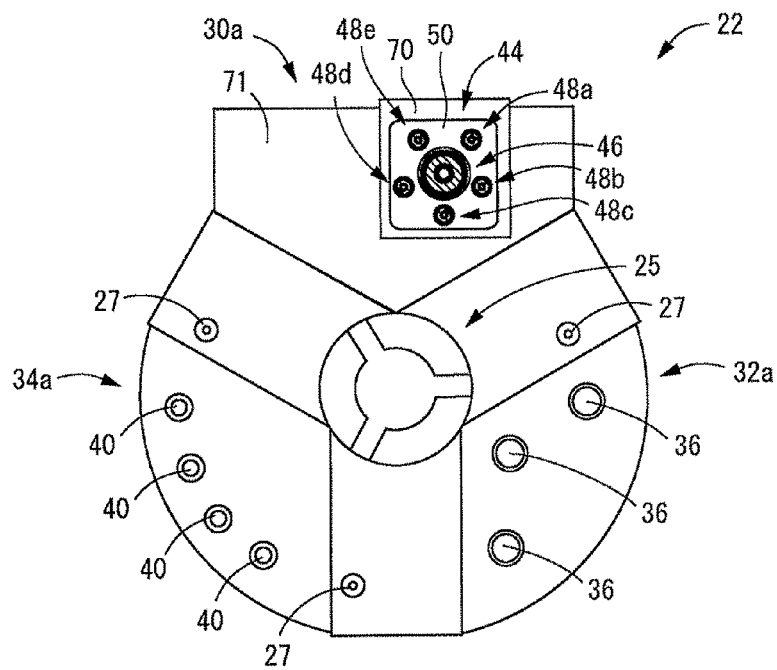
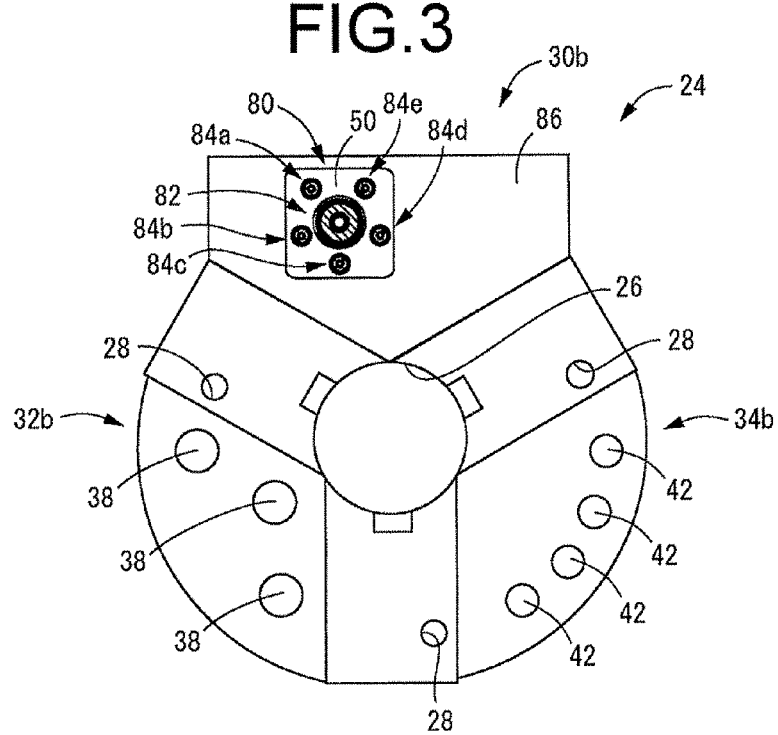

MODULE FOR AUTOMATIC TOOL EXCHANGE DEVICE

TECHNICAL FIELD

The present invention relates to a module for an automatic tool exchange device used for automatic tool exchange devices for which it is possible for a first coupling member attached to one of either a robot main unit side or tool side and a second coupling member attached to the other to be separated from and coupled to each other, an automatic tool exchange device using that, and a robot using that automatic tool exchange device.

BACKGROUND ART

Automation in the automotive industry, the aircraft industry and the like is always advancing, and with the robots used for this, through improvements in sensing technology, control technology and the like, it is becoming possible to realize complex work at a higher level. In recent years, for example, spot welding, deburring, chassis lifting and the like in the automotive manufacturing process are almost all done by robots, and the ratio of work performed by robots in manufacturing processes is very high.

However, specially preparing robots equipped with tools such as spot welding guns used for welding, cutting tools used for deburring, manipulators for handling chassis and the like is not desirable from the perspective of the expense for building the production line, factory space efficiency and the like.

In light of this, for example an automatic tool exchange device noted in Patent Document 1 or Patent Document 2 is used. This automatic tool exchange device is typically constituted so that a first coupling member attached to one of either the robot main unit side or the tool side and a second coupling member attached to the other are able to be separated from and coupled to each other. By doing this, tool exchange is possible, and it is possible to handle a plurality of tools with one robot.

Then, depending on the used tools, various modules are provided that, between the first coupling member and the second coupling member, make it possible to transmit electrical signals or power, or make it possible to supply a liquid or gas. These modules are constituted in pairs of a first module attached detachably to the first coupling member, and a second module attached detachably to the second coupling member, and by coupling the first coupling member and the second coupling member, the first module and second module are coupled to each other. Then, in this coupled state, it is possible to transmit electrical signals or power, or to supply liquid or gas between the first module and the second module. Here, the modules that make it possible to transmit electrical signals, as noted in Patent Document 1, almost all have this performed by the pin contact point by having a pin projecting from one of the first and second modules be in contact with a terminal provided on the other.

However, robots used in production factories have the tools moved quickly to reduce takt time, so significant acceleration is applied to the connecting parts of an automatic tool exchange device. In light of this, many automatic tool exchange devices allow a certain amount of play while maintaining the coupled status between the first coupling member and the second coupling member in order to reduce the load when moving with high acceleration. Because of that, when large acceleration is applied to the automatic tool exchange device, by the first module and the second module being separated from each other, there was the risk of a contact failure occurring because of a separation between the pin and the terminal. A contact failure of the pin contact points brings on electrical signal transmission failure, and was a cause of a decrease in processing precision due to not correctly obtaining various types of sensing information by the position sensor attached on the robot, for example, or bringing on emergency stopping of the robot in some cases, reducing production efficiency.

Also, within a production factory, because work machines such as a large number of robots are operating together with work such as welding, painting, cleaning or the like being performed, it is easy for this to become a high temperature, high humidity environment, and for pin contact points, contact failure occurred easily as well in a high temperature, high humidity environment. Furthermore, because there is the risk of contact failure occurring due to dust, slag or the like entering between the pin and the terminal, the occurrence of wear, deformation, a film or the like due to repeated connection, time and effort were required for maintenance such as regular examination or cleaning of pin contact points or the like. In addition, damage occurs easily due to the pins projecting, so both members need to be aligned with good precision so as not to break the pin when coupling the first coupling member and the second coupling member, and the work of exchanging tools required time.

To avoid these problems, for example as noted in Patent Document 3, using data communication technology that is wireless such as a wireless LAN or the like, it is possible to perform sending and receiving of electrical signals on the robot main unit side and the tool side. However, robots used in production factories require high level real time properties to operate quickly according to signals from the position sensor for accurate aligning of tools or the like, for example. Nevertheless, wireless data communication requires a large number of processes for the generation of sending data packets on the sending side and the restoring of data by the receiving side, and there is the risk of losing responsiveness. Also, in an environment in which a large number of robots are operating simultaneously, when attempting to control each robot wirelessly, it is impossible to avoid the problems of interference and noise mixing in, so this was not realistic.

BACKGROUND ART DOCUMENTS

Patent Documents

Patent Document 1: JP-A-2004-1177
Patent Document 2: JP-A-2006-15429
Patent Document 3: JP-A-2007-514558

SUMMARY OF THE INVENTION

Problem the Invention Attempts to Solve

The present invention has been developed in view of the above-described matters as the background, and it is an object of the present invention to provide a module for an automatic tool exchange device with a novel constitution which is able to perform transmission of electrical signals with higher reliability while preventing a decrease in transmission efficiency between a first coupling member and a second coupling member.

Another object of the present invention is to provide an automatic tool exchange device with a novel constitution that is equipped with that kind of module for an automatic tool exchange device. In addition, another object of the present invention is to provide a robot with a novel constitution equipped with that kind of automatic tool exchange device.

Means for Solving the Problem

Following are noted modes of the present invention made to resolve the problems described above. Note that the structural elements used in each mode noted below can be used freely in all possible combinations.

Specifically, the first mode of the present invention relating to the module for an automatic tool exchange device is a module for an automatic tool exchange device used for an automatic tool exchange device for which a first coupling member attached to one of either a robot main unit side and a tool side and a second coupling member attached to another are coupled to each other with an ability to be separated, and includes a first module provided detachably on the first coupling member and a second module provided detachably on the second coupling member, for transmitting electrical signals between the first coupling member and the second coupling member by permitting transmission of electrical signals between this first module and second module, characterized in that: a core member is combined with a coil member and a transmission surface including a magnetic path open surface formed by the core member is provided, and an electromagnetic shielding member is arranged on an outer circumference of the core member except for the transmission surface, and also, interposed between the core member and the electromagnetic shielding member is a gap member having a lower electromagnetic shielding effect than the electromagnetic shielding member, constituting at least one coil head including the coil member, core member, and gap member, and meanwhile, using a pair of coil units constituted containing the coil head and the electromagnetic shielding member, by positioning the core member transmission surfaces facing opposite each other, constituted is an opposite facing type interface for performing transmission of electrical signals using an electromagnetic induction effect, and one of the coil units on the opposite facing type interface is attached to the first module and another is attached to the second module by which it is possible to transmit electrical signals between the first module and the second module.

If a module for an automatic tool exchange device constituted according to this mode is used, it is possible to electrically connect both modules in a mutual non-contact state by placing the transmission surfaces provided on the pair of coil units facing opposite each other. By doing this, even in a case when excess acceleration occurs at the automatic tool exchange device by the robot being quickly driven or the like, and both modules are separated from each other, it is possible to reduce the risk of contact failure such as of the pin contact points occurring, and it is possible to perform stable transmission of electrical signals or the like.

Furthermore, the automatic tool exchange device is an item used to make tool exchange easy, so with the first coupling member and the second coupling member that constitute the automatic tool exchange device, coupling and uncoupling are repeated many times and implemented frequently. In light of this, with this mode, since there is no physical connecting part such as pin contact points, it is possible to obtain excellent durability in relation to repeated coupling and uncoupling. In addition, at the time of this coupling, there is no need for high precision aligning of positions to each other as is the case with pin contact points, so it is possible to perform tool exchange work more quickly. Furthermore, it is possible to avoid the problem of contact failure due to a high temperature, high humidity environment, dust or the like, so it is possible to perform high reliability transmission.

Also, with this mode, because electrical signal transmission is performed using an electromagnetic inductance effect, the separation distance of both transmission surfaces is relatively small. Therefore, there is little risk of interference or the risk of noise mixing in with transmission using data communication technology such as wireless LAN or the like, for example, as noted in Patent Reference 3 described previously, and it is possible to obtain high reliability. Furthermore, during transmission, since performing complex data processing is also not necessary, it is possible to perform transmission quickly, and this is favorably used in robots requiring a high level of real time properties.

Then, specifically with this mode, an electromagnetic shielding member is arranged on the outer circumference of the core member, so there is reduced risk of noise mixing in due to external electromagnetic waves, and there is also reduced risk of electromagnetic waves that occur between both coil heads having an adverse effect on external apparatuses. Furthermore, specifically with this mode, between the core member and the electromagnetic shielding member is interposed a gap member having a lower electromagnetic shielding effect than the electromagnetic shielding member. Here, the electromagnetic shielding effect means shield effectiveness in relation to electromagnetism including electric fields and magnetic fields, and is expressed by the rate of change size (absolute value) expressed by (Formula 1) noted below. Note that in (Formula 1) noted below, $E_{out}$ indicates the output electric field strength (V/m), and $E_{in}$ indicates the incident electric field strength (V/m).

$$\text{Change rate} = 20 \log(E_{out}/E_{in}) \quad \text{(Formula 1)}$$

Then, by interposing this gap member, there is no direct contact of the electromagnetic shielding member on the outer circumference surface of the core member, and this is arranged separated by a specified distance. By doing this, the risk of the electromagnetic waves from the core member being absorbed by the electromagnetic shielding member and the like is reduced, and it becomes possible to gather more magnetic flux at the transmission surface, and it is also possible to reduce the risk of the electromagnetic energy of the coil head decreasing due to the occurrence of an eddy current by the lines of magnetic force that enter the electromagnetic shielding member and the like. As a result, it is possible to perform transmission with higher reliability, and even when the separation distance of both transmission surfaces becomes even bigger, it is possible to perform transmission of electrical signals and the like with more stability. Note that specifically with this mode, as the gap member, a member with a small magnetic permeability can be favorably used. By working in this way, by making the external magnetic permeability of the core member sufficiently low, it is possible to suppress the leaking out of lines of magnetic force from the outer circumference surface other than the transmission surface with the core member, and it is possible to further increase transmission reliability.

A second mode of the present invention relating to a module for an automatic tool exchange device is a module for an automatic tool exchange device of the first mode, characterized in that the core member is a round cylinder shape equipped with a circumference groove that opens in one axis direction, and that the transmission surface is constituted by an open side end surface of the circumference groove by the coil member being arranged inside the circumference groove.

With this mode, the direction of the coil member axis attached to the core member is roughly equal to the core member axis direction, so it is possible to make the direction of the lines of magnetic force generated from the coil member be roughly the same as the core member axis direction, and it is possible to effectively gather lines of magnetic force at the transmission surface formed on the core member axis direction end part.

A third mode of the present invention relating to the module for an automatic tool exchange device is the module for an automatic tool exchange device of the first or second mode, characterized in that the transmission surfaces for the pair of coil units are able to be in contact with each other with the first coupling member and the second coupling member in a coupled state.

With this mode, it is possible to perform transmission with higher reliability. Then, the automatic tool exchange device, different from the movable parts of a robot or the like, have both coupling member relative displacement occur only in exceptional cases, so even if both transmission surfaces are in a contact state, there is little concern about wear or the like due to rubbing each other. Note that both transmission surfaces with this mode can always maintain a contact state even in cases when a large acceleration is applied to the automatic tool exchange device and separation occurs between both modules, for example, and in such a case, it is possible to have both transmission surfaces temporarily separate.

A fourth mode of the present invention relating to a module for an automatic tool exchange device is a module for an automatic tool exchange device of any one of the first through third modes, characterized in that the one of the pair of coil units is provided fixed to one of either the first module and the second module, and the other of the pair of coil units is provided via an elastic support member to be able to be displaced along a specified range in an opposite facing direction of the pair of coil units in relation to another of the first module and the second module.

With this mode, from the fact that one of the coil units can be displaced in the opposite facing direction, in the state with the first module and the second module coupled, it is possible to absorb the coil unit's transient proximity and separation. Then, rather than providing an elastic support member on both modules, it is possible to reduce the manufacturing cost by providing it on only one or the other module.

A fifth mode of the present invention relating to a module for an automatic exchange device is a module for an automatic tool exchange device of the fourth mode, characterized in that the elastic support member is constituted by an energizing member energizing the coil unit provided on one of either the first module and the second module in a state projecting toward the other of the first module and the second module.

With this mode, with the first coupling member and the second coupling member in a coupled state, even in a case when a gap occurs between the first module and the second module, or a case when transient acceleration is applied and both modules are separated from each other, it is possible to maintain from between a contact state of both transmission surfaces to a suitably separated distance. Note that as the energizing member for this mode, for example, a coil spring or plate spring, or a rubber elastic body or the like can be favorably used.

A sixth mode of the present invention relating to a module for an automatic tool exchange device is a module for an automatic tool exchange device of the fifth mode, characterized in that a maximum projecting volume of the coil unit made to project by the energizing member is larger than a maximum separation volume of the first module and the second module in the opposite facing direction of the coil units.

With this mode, it is possible to have the transmission surfaces of both coil units in a contact state, as well as to maintain the contact state of both transmission surfaces even in a case when there is a large separation between the first module and the second module in the opposite facing direction when a large acceleration is applied to the automatic tool exchange device or the like, for example, and it is possible to maintain transmission with higher reliability.

A seventh mode of the present invention relating to a module for an automatic tool exchange device is a module for an automatic tool exchange device of the fifth or sixth mode, characterized in that the energizing member is constituted including a coil spring that applies energizing force to the coil unit, and a locking part that locks the coil unit and blocks detachment from the first module or the second module.

With this mode, it is possible to apply an effective energizing force to the coil unit using the coil spring, and it is also possible to set the projecting volume of the coil unit with good precision.

An eighth mode of the present invention relating to a module for an automatic tool exchange device is a module for an automatic tool exchange device of the seventh mode, characterized in that the module further comprises a holder that holds the coil unit, the energizing member for applying energizing force to the coil unit using restoration force of the coil spring is constituted by pushing through the coil spring inside the holder from an opening part opened to a side opposite the transmission surface of the coil unit at the holder, and by compression deforming the coil spring between a lid member that plugs the opening part and the coil unit.

By working in this way, it is possible to easily attach the coil spring that applies energizing force to the coil unit inside the module, and it is possible to easily constitute the energizing member.

A ninth mode of the present invention relating to a module for an automatic tool exchange device is a module for an automatic tool exchange device of any one of the first through eighth modes, characterized in that one of the transmission surfaces of the pair of coil units is made to be larger than another of the transmission surfaces in a direction orthogonal to the direction facing opposite the other of the transmission surfaces.

With this mode, even in a case when the pair of coil units are displaced in a direction orthogonal to the opposite facing direction by the application of large acceleration to the automatic tool exchange device or the like, for example, it is possible to maintain the opposite facing state of the transmission surfaces of both coil units, and it is possible to perform more stable transmission.

A tenth mode of the present invention relating to a module for an automatic tool exchange device is a module for an automatic tool exchange device of the ninth mode, characterized in that, compared to the other of the transmission surfaces, the one of the transmission surfaces of the pair of coil units is larger than a maximum displacement volume between the first module and the second module in the direction orthogonal to the opposite facing direction of the coil units.

Working in this way, it is possible to always maintain the opposite facing status of both coil unit transmission surfaces, and it is possible to perform transmission with even higher reliability.

An eleventh mode of the present invention relating to a module for an automatic tool exchange device is a module for an automatic tool exchange device of any one of the first through tenth modes, characterized in that the coil unit of each of the first module and second module includes the at least one coil head comprising a plurality of coil heads.

With this mode, particular electrical signals are made to be transmitted by each coil head, and it is possible to transmit a plurality of electrical signals. By doing this, for example by providing three coil heads on the coil unit, the servo motor encoder signals A phase output signal, B phase output signal, and Z phase output signal are respectively allocated to each coil head, and it is possible to transmit these three electrical signals between both modules, for example.

A twelfth mode of the present invention relating to a module for an automatic tool exchange device is a module for an automatic tool exchange device of any one of the first through eleventh modes, characterized in that the respective first module and second module include other coil units so as to have the plurality of coil heads.

With this mode as well, it is possible to provide a plurality of coil heads, and it is possible to perform transmission of a plurality of electrical signals. Of course, combining this mode with the eleventh mode makes it possible to provide a plurality of coil units equipped with a plurality of coil heads.

A thirteenth mode of the present invention relating to a module for an automatic tool exchange device is a module for an automatic tool exchange device of the eleventh or twelfth modes, characterized in that the module is able to transmit power in addition to the electrical signals, and the plurality of coil heads are constituted including a coil head for power for transmitting power and a coil head for signals for transmitting signals.

With this mode, it is possible to perform transmission of power in addition to electrical signals between the first module and the second module. By doing this, it is possible to supply the drive power of an apparatus driven at relatively low power such as a sensor, for example, and it is possible to further reduce the number of cables.

A fourteenth mode of the present invention relating to a module for an automatic tool exchange device is a module for an automatic tool exchange device of the thirteenth mode, characterized in that the transmission surface of the coil head for power is larger than the transmission surface of the coil head for signals.

To transmit power that can drive an apparatus such as a sensor or the like, it is necessary to have greater induced electromotive force in relation to the transmission of electrical signals, so a greater change in volume of magnetic flux is needed. Therefore, by using a constitution like this mode, it is possible to advantageously obtain the necessary magnetic flux change volume for transmitting power.

A fifteenth mode of the present invention relating to a module for an automatic tool exchange device is a module for an automatic tool exchange device of any one of the first through fourteenth modes, characterized in that the module is able to transmit power in addition to electrical signals.

Specifically, it is acceptable to provide a plurality of coil heads and use those divided into coil heads for power and coil heads for signals, but as with this mode, even when only a pair of coil heads is equipped, it is also possible to transmit power using that pair of coil heads.

A sixteenth mode of the present invention relating to a module for an automatic tool exchange device is a module for an automatic tool exchange device of any one of the first through fifteenth modes, characterized in that as the electrical signals, at least one of a sensor signal, encoder signal, and serial signal is included.

By working in this way, it is possible to advantageously constitute a signal delivery path of various sensors such as a photoelectric sensor, ultrasonic sensor or the like or a servo motor or the like using a module for an automatic tool exchange device according to the present invention.

A seventeenth mode of the present invention relating to a module for an automatic tool exchange device is a module for an automatic tool exchange device of any one of the first through sixteenth modes, characterized in that the electromagnetic shielding member is formed from at least one of aluminum, copper, iron, nickel, magnetite, gadolinium, cobalt, a ferrimagnetic body, a conductive powder material, and a conductive coating material. With this mode, it is possible to obtain a good electromagnetic shielding effect.

An eighteenth mode of the present invention relating to a module for an automatic tool exchange device is a module for an automatic tool exchange device of any one of the first through seventeenth modes, characterized in that the gap member is formed from at least one of polytetrafluoroethylene, epoxy resin, plastic, wood, paper, cloth, a nonconductive coating material, reinforced plastic, glass, natural resin, and synthetic resin. With this mode, it is possible to advantageously inhibit magnetic flux leaked from the coil head.

To characterize the present invention relating to an automatic tool exchange device, for which a first coupling member attached to one of either a robot main body side and a tool side and a second coupling member attached to another are coupled to each other with an ability to be separated, the device being equipped with a module for an automatic tool exchange device of any one of the first through eighteenth modes.

With this mode, using a module for an automatic tool exchange device of any one of the first through eighteenth modes, it is possible to perform transmission of electrical signals between the first coupling member and the second coupling member. By doing this, it is possible to reduce the risk of breakage of pins due to relative displacement of both coupling members or of bringing on a decrease in transmission quality due to dust or the like such as with a pin connection or the like. Furthermore, by specifically providing an electromagnetic shielding member at the outer circumference of the core member, there is a reduced risk of the automatic tool exchange device being affected by the noise from outside or affecting the outside, and by providing a gap member between the core member outer circumference and the electromagnetic shielding member, it is possible to inhibit leaking of magnetic flux from the outer circumference other than the transmission surface at the core member, and to make the separation distance for which transmission is possible with both transmission surfaces bigger, so even in cases when a large acceleration is applied to the first coupling member and the second coupling member and they are separated from each other, it is possible to perform more stable transmission.

A characteristic of the first mode of the present invention relating to a robot is that it is equipped with the aforementioned automatic tool exchange device.

With this kind of robot, it is possible to reduce the number of cables run for transmitting electrical signals, and it is possible to make the overall size of the robot more compact. Furthermore, since there is low risk of wear that comes with a curve or the like such as with a cable or the like, it is also possible to improve maintenance properties. Then, because a high level wireless communication technology or the like is not necessary, it is possible to reduce the manufacturing cost, and in an environment in which a large number of robots are operating as well, it is possible to avoid the risk of interference or the like, and it is possible to perform transmission with high reliability.

A second mode of the present invention relating to a robot is a robot of the first mode, further comprising: a first member and a second member coupled by a rotation axis and made to be able to rotate relative to each other around the rotation axis; and a harnessless device being constituted including at least one first coil unit attached to the first member and at least one second coil unit attached to the second member, wherein: the first coil unit includes a first core member being constituted by a plurality of partial core members being arranged mutually separated on a circumference, and also, at least one first coil head being constituted by a first coil member extending on the circumference on which the plurality of partial core members are arranged being attached to the first core member, and a first transmission surface consisting of a magnetic path open surface being formed by the partial core member at the first coil head, the first coil unit being constituted by the plurality of the partial core members being arranged in a circular form on a first support member by the first coil head being supported on the first support member; the second coil unit includes a second core member being constituted with a circumference direction length greater than a maximum value of a circumference direction separation distance of the partial core members adjacent in the circumference direction at the first core member, and also, at least one second coil head being constituted by a second coil member being attached to the second core member, and a second transmission surface consisting of a magnetic path open surface being formed by the second core member at the second coil head, the second coil unit being constituted by having the second coil head supported by a second support member; and by attaching the first coil unit to the first member being a state with the first core member placed coaxially with a rotation center axis of the rotation axis, and also, by attaching the second coil unit to the second member, the second transmission surface at the second core member is positioned facing opposite and able to rotate relative to each other around the rotation center axis with a specified distance separated in relation to the first transmission surface at the first core member, while the second core member, at any position on the circumference, being arranged so as to be in an opposite facing state in relation to at least one of the plurality of partial core members so that electrical signal transmission is possible using the electromagnetic induction between the first coil head and the second coil head.

With this mode, providing cables that straddle the first member and the second member to transmit electrical signals becomes unnecessary. By doing this, it becomes possible to endlessly rotate the first member and the second member around the rotation axis while maintaining an electrical connection. Then, because the cable becomes unnecessary, it is also unnecessary to bend the cable and arrange it, and it is possible to make the robot constituted including the first member and the second member more compact.

Furthermore, from the fact that the first transmission surface of the first core member and the second transmission surface of the second core member are in a mutual non-contact state, it is possible to avoid wear due to repeated rubbing or the like that comes with mutual displacement, and it is possible to obtain excellent durability.

In addition, from the fact that electrical signal transmission is performed using an electromagnetic coupling between the first coil head and second coil head placed facing each other, the separation distance of the transmission surfaces of both coil heads is relatively small. Therefore, there is a low risk of the kind of interference or risk of noise mixing in as with transmission using data communication technology such as wireless LAN or the like noted in Patent Reference 3 described previously, for example, and it is possible to obtain high reliability. Furthermore, during transmission, it is not necessary to perform complex data processing, so it is possible to perform fast transmission, and this can be suitably used for the joint parts of robots that require a high level of real time properties.

Furthermore, specifically with this mode, the first core member is formed from a plurality of partial core members and is divided in the circumference direction. By doing this, it is possible to lighten the weight of the first core member, and it is also possible to reduce the manufacturing cost. Furthermore, compared to when using a core member continuous in the circumference direction, it is possible to inhibit dispersion of magnetic flux and to focus the magnetic flux on the transmission surface of each partial core member, and it is possible to perform more stable transmission of electrical signals. Also, it becomes easier for the electromagnetic waves flowing inside the core to be converted to heat or the like inside the core as the frequency become higher, and to cause attenuation. In light of that, by dividing the core in the circumference direction and making the circumference direction length short, it is possible to reduce the volume of electromagnetic waves attenuated within the core, making it possible to perform higher reliability transmission.

Note that the partial core member of this mode can extend to an arc shape with a specified curvature, but it is also possible to arrange a partial core member extending in a straight line form onto a circle or the like. Also, for the second core member as well, it is possible to extend on an arc shape with a specified curvature, and also to be an item extending in a straight line form.

A third mode of the present invention relating to a robot is a robot of the second mode, characterized in that the second core member is in a shape extended partially in the circumference direction of the first core member. By working in this way, from the fact that it is possible to make the dimensions of the second core member smaller, it is possible to decrease the weight of the second coil unit as well. Also, compared to a core member that continues around the entire circumference, it is possible to inhibit magnetic flux dispersion and attenuation, and it is possible to perform higher reliability transmission.

A fourth mode of the present invention relating to a robot is a robot of the second or third mode, characterized in that a circumference direction length of the plurality of partial core members are equal to each other, and the first core member is constituted by the plurality of partial core members being arranged separated by an equal distance in the circumference direction on a concentric circle.

By working in this way, from the fact that partial core members are arranged evenly on the circumference of the first core member, it is possible to inhibit a large bias in the distribution of magnetic flux in the circumference direction of the first core member, and it is possible to perform more stable transmission.

A fifth mode of the present invention relating to a robot is a robot of any one of the second through fourth modes, characterized in that the plurality of partial core members are in an arc shape having mutually equal curvatures, and also, the second core member is in a shape extending in the circumference direction having an equal curvature to the partial core member.

With this mode, when doing relative rotation of the second core member in relation to the partial core member, it is possible to maintain a high level of the opposite facing state of the first transmission surface of the partial core member and the second transmission surface of the second core member. By doing this, it is possible to perform higher reliability transmission.

A sixth mode of the present invention relating to a robot is a robot of any one of the second through fifth modes, characterized in that a dimension of the first coil head in a direction facing opposite the second core member is equal to a thickness dimension of the first support member in the direction facing opposite the second core member, and at the first support member, the first coil head is attached in an inserted state inside a through hole placed penetrating in the direction facing opposite the second core member.

With this mode, in the first core member and the second core member opposite facing direction, the dimension of the through hole placed penetrating the first support member and the dimension of the first coil head are made equal, so by having the first coil head fitted into the through hole, the end surface of the partial core member constituting the first coil head, the another way, the first transmission surface, can be easily aligned to the end surface of the first support member. Then, since it is easy to align the end surfaces of the respective plurality of partial core members to the end surface of the same first support member, it is possible to have the separation distance of the second core member and partial core member in the opposite facing direction be roughly constant along the entire circumference of the first core member. By doing this, it is possible to inhibit bias of magnetic flux in the circumference direction of the first core member, and it is possible to perform more stable transmission.

A seventh mode of the present invention relating to a robot is a robot of any one of the second through sixth modes, characterized in that a dimension of the second coil head in a direction facing opposite the first core member is equal to a thickness dimension of the second support member in the direction facing opposite the first core member, and at the second support member, the second coil head is attached in an inserted state inside a through hole placed penetrating in the direction facing opposite the first core member.

With this mode, in the first core member and second core member opposite facing direction, because the dimension of the through hole placed penetrating the second support member and the dimension of the second coil head are equal, by having the second coil head fitted into the through hole, the end surface of the second core member constituting the second coil head, the another way, the second transmission surface, can be aligned easily to the end surface of the second support member.

An eighth mode of the present invention relating to a robot is a robot of any one of the second through seventh modes, characterized in that the first support member is constituted by a plurality of partial support members extending partially in the circumference direction, and the first coil member is constituted by lead wires provided on each of these partial support members being connected to each other.

With this mode, by attaching the plurality of partial support members to each other sandwiching the rotation center axis of the rotation axis, it is possible to constitute the first coil member positioned coaxially with the rotation center axis of the rotation axis. By doing this, for example on existing robots or the like, it is possible to easily attach the harnessless device.

A ninth mode of the present invention relating to a robot is a robot of the eighth mode, characterized in that the first support member is constituted by a pair of the partial support members having a semicircle shape, and at the respective partial support members, coil forming parts extending in the circumference direction of the partial support member are formed at the lead wires, and the partial core member is combined with the coil forming part, and meanwhile, by bending back the lead wire at one end part of the circumference direction of the partial support member, and making it possible to connect the lead wire provided on one of the partial support members to the lead wire provided on another of the partial support members at another end part, the first coil member is constituted by each of the coil forming parts with these partial support members in a combined state.

With this mode, it is possible to form the first support member simply by combining a pair of the partial support members, so it is possible to easily attach the first support member to the first member, and also, it is possible to easily form the first coil member.

Note that as the opposite facing direction of the first transmission surface and the second transmission surface, as the tenth mode of the present invention relating to a robot, with a robot of any one of the second through ninth modes, it is possible to use a mode for which the first transmission surface at the first core member and the second transmission surface at the second core member are positioned facing opposite in an axis direction of the rotation center axis, or alternatively, as an eleventh mode of the present invention relating to a robot, with a robot of any one of the second through ninth modes, it is possible to use any mode for which the first transmission surface at the first core member and the second transmission surface at the second core member are positioned facing opposite in a direction orthogonal to an axis direction of the rotation center axis.

A twelfth mode of the present invention relating to a robot is a robot of any one of the second through eleventh modes, characterized in that at least at one of the first core member and the second core member, a high shielding effect member having a high electromagnetic shielding effect is arranged at an outer circumference except for the first transmission surface or the second transmission surface.

Here, the electromagnetic shielding effect means a shield effect in relation to electromagnetism including electric fields and magnetic fields expressed by [Formula 1] noted above. Then, a high electromagnetic shield effect means typically a shield effect of a level that can be used as an electromagnetic shielding member, and in specific terms, the shield effect is 30 dB or greater, and more preferably is 60 dB or greater. With this mode, it is possible to inhibit the first core member and the second core member being affected by electromagnetic waves from outside, and it is possible to perform more stable electrical signal transmission. It is also possible to inhibit the effect of electromagnetic waves generated from the first coil head or the second coil head on other electronic parts.

A thirteenth mode of the present invention relating to a robot is a robot of the twelfth mode, characterized in that at least one of the first support member and the second support member is the high shielding effect member. With this mode, it is not necessary to specially provide the electromagnetic shielding member, and it is possible to reduce the number of parts.

A fourteenth mode of the present invention relating to a robot is a robot of any one of the second through thirteenth modes, characterized in that the first coil unit and the second coil unit are covered by the high shielding effect member having a high electromagnetic shielding effect.

With this mode, it is possible to protect roughly the entire harnessless device from the noise of electromagnetic waves, and also, it is possible to more effectively inhibit the effect of electromagnetic waves generated from the harnessless device on other electronic parts.

A fifteenth mode of the present invention relating to a robot is a robot of any one of the twelfth through fourteenth modes, characterized in that the high shielding effect member is formed from at least one of aluminum, copper, iron, nickel, magnetite, gadolinium, cobalt, a ferrimagnetic body, a conductive powder material, and a conductive coating material. With this mode, it is possible to obtain a good electromagnetic shielding effect.

A sixteenth mode of the present invention relating to a robot is a robot of any one of the second through fifteenth modes, characterized in that at least at one of the first core member and the second core member, a low shielding effect member having a low electromagnetic shielding effect is arranged at the outer circumference except for the first transmission surface or the second transmission surface.

Here, a low electromagnetic shielding effect typically means a shield effect that is difficult to use as an electromagnetic shield member, and in specific terms, means an item for which the shield effect is 30 dB or less, and more desirably 20 dB or less. Then, with this mode, there is a decrease in the magnetic flux that leaks out from the low shielding effect member or the outer circumferences except for the transmission surface of the core member, and the magnetic flux is focused on the transmission surface of the core member, so it is possible to perform higher reliability transmission. Note that specifically with this mode, as the low shielding effect member, it is desirable to use a member with a low magnetic permeability. By working in this way, by making the core member outside magnetic permeability sufficiently small, it is possible to inhibit the outflow of magnetic force lines from the outer circumference surface other than the transmission surface at the core member, and it is possible to increase the transmission reliability.

A seventeenth mode of the present invention relating to a robot is a robot of the sixteenth mode, characterized in that at least at one of the first core member and the second core member, a high shielding effect member having a high electromagnetic shielding effect is arranged at the outer circumference except for the first transmission surface or the second transmission surface, and also, the low shielding effect member is arranged between the outer circumference of the core member and the high shielding effect member.

With this mode, by interposing the low shielding effect member between the core member outer circumference and the high shielding effect member, the high shielding effect member is arranged separated by a specified distance without being in direct contact with the outer circumference surface of the core member. By doing this, the risk of the electromagnetic waves emitted from the core member being absorbed by the high shielding effect member and the like is reduced, and it becomes possible to focus a higher amount of the magnetic flux on the transmission surface, and also, it is possible to reduce the risk of a decrease in the electromagnetic energy of the coil head due to the occurrence of eddy current by magnetic lines of force entering the high shielding effect member or the like. As a result, it is possible to perform higher reliability transmission, and even in a case when the separation distance of both transmission surfaces is bigger, it is possible to perform more stable transmission of electrical signals and the like.

An eighteenth mode of the present invention relating to a robot is a robot of the sixteenth or seventeenth mode, characterized in that the low shielding effect member is formed from at least one of polytetrafluoroethylene, epoxy resin, plastic, wood, paper, cloth, a nonconductive coating material, reinforced plastic, glass, natural resin, and synthetic resin. With this mode, it is possible to advantageously inhibit the effect of magnetic flux leaked from the core member.

A nineteenth mode of the present invention relating to a robot is a robot of any one of the second through eighteenth modes, characterized in that a plurality of sets are equipped of the first coil unit and the second coil unit set.

With this mode, it is possible to transmit different electrical signals for each set of the first coil unit and the second coil unit, and it is possible to transmit a plurality of electrical signals simultaneously and with high reliability.

A twentieth mode of the present invention relating to a robot is a robot of the nineteenth mode, characterized in that the at least one first coil head comprises a plurality of first coil heads, and the at least one first coil unit comprises a plurality of first coil units that are constituted as a single unit by providing the plurality of first coil heads in concentric form on the first support member.

With this mode, from the fact that the first support member is used in common by a plurality of the first coil units, it is possible to reduce the number of parts and lighten the weight, and also, it is possible to handle a plurality of coil units as a single unit, so manufacturing such as attaching to the first member is easier.

A twenty-first mode of the present invention relating to a robot is a robot of the twentieth mode, characterized in that a pair of the first coil heads having mutually equal diameter dimensions are respectively arranged on both end parts of the axis direction of the rotation center axis at the first support member attached to the first member, and also, the at least one second coil head comprises a pair of second coil heads corresponding to these first coil heads and are arranged at sides facing opposite each other, sandwiching the first support member in the axis direction of the rotation center axis, and the first transmission surface at the first coil head and the second transmission surface at the second coil head are positioned facing opposite with a specified distance separated from each other in the axis direction of the rotation center axis.

With this mode, by providing the first coil head at both surfaces of the first support member, it is possible to arrange with good space efficiency a pair of the first coil heads having the same diameter dimensions to each other.

A twenty-second mode of the present invention relating to a robot is a robot of any one of the second through twenty-first modes, characterized in that it is possible to transmit power in addition to the electrical signals using the harnessless device. With this mode, it is possible to supply drive force to electronic parts that can be driven by relatively low power such as various types of sensor or the like, for example.

BRIEF DESCRIPTION OF THE DRAWINGS

FIG. 2 is a front view showing a first coupling member.

FIG. 3 is a front view showing a second coupling member.

EMBODIMENTS FOR CARRYING OUT THE INVENTION

Figure 1:
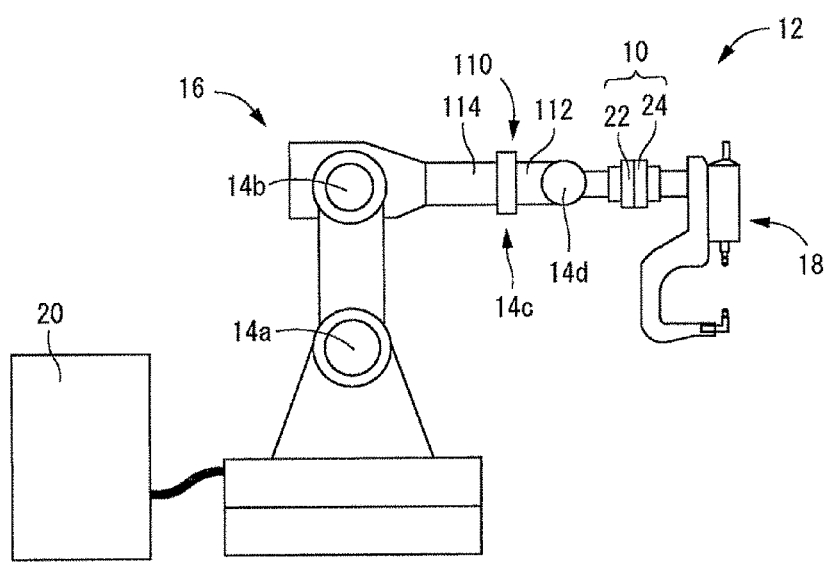
FIG. 1 is a view showing a robot equipped with an automatic tool exchange device as a first embodiment of the present invention.

Following, to further clarify the present invention more specifically, embodiments of the present invention are described in detail while referring to the drawings.

First, shown in model form in FIG. 1 is a robot 12 equipped with a tool changer 10 of an automatic tool exchange device as an embodiment of the present invention. The robot 12 is constituted with a tool 18 provided at the tip of an arm member 16 equipped with a plurality of joints 14a through 14d. As the tool 18, for example, it is possible to use various prior well known types of tools such as cutting tool or manipulator used for debarring or the like, and in this embodiment, a spot welding gun used for spot welding is used. Then, this tool 18 is electrically connected to a controller 20 provided on the main unit side of the robot 12, and it is possible to transmit electrical signals such as control signals or the like between the tool 18 and the controller 20.

In more detail, the tool 18 is provided detachably on an arm member 16 via a tool changer 10 as the automatic tool exchange device. The tool changer 10 is constituted containing a robot side adapter 22 as a first coupling member, and a tool side adapter 24 as a second coupling member, and while the robot side adapter 22 is attached to the main unit side of the robot 12, the tool side adapter 24 is provided on the tool 18 side. Then, by having the robot side adapter 22 and the tool side adapter 24 coupled so as to be able to be detached from each other, the tool 18 is attached to the robot 12 in a detachable manner.

FIG. 2 shows the robot side adapter 22 in model form, and FIG. 3 shows the tool side adapter 24 in model form. Note that in FIG. 2, FIG. 3, and in FIG. 4 described later, to make it easier to understand, these are shown with omission of the protective member 63 described later. A chuck 25 projecting in a cylinder shape is provided at the center part of the robot side adapter 22, and this chuck 25 is inserted into a coupling hole 26 provided at the center part of the tool side adapter 24, and by having a cam (not illustrated) projecting outward in the diameter direction from the chuck 25 and latched inside the coupling hole 26, the robot side adapter 22 and the tool side adapter 24 are coupled to each other. Also, a plurality (with this embodiment, three) of alignment pins 27 formed projecting as a single unit are formed in the circumference direction on the robot side adapter 22, and alignment of the robot side adapter 22 and the tool side adapter 24 in the circumference direction is performed by the alignment pin 27 being inserted in an alignment hole 28 formed on the tool side adapter 24.

On the robot side adapter 22 and the tool side adapter 24 are respectively attached detachably a pair of various modules for an automatic tool exchange device according to the type of tool 18 used, and the like. With this embodiment, as the module for an automatic tool exchange device, one of the three pairs of modules, signal feed modules 30a and 30b, power feed modules 32a and 32b, and air feed modules 34a and 34b, are attached detachably to the robot side adapter 22, and the other is attached detachably to the tool side adapter 24, respectively, using a set screw or the like.

The power feed modules 32a and 32b are a pair of prior known modules for power feed, for example. One module 32a includes a power feed pin 36 provided in a projecting state for supplying power of the necessary size for welding or the like, and the other module 32b includes a flat terminal 38 with which the power feed pin 36 is in contact and electrically connected. Then, one module 32a is attached to the robot side adapter 22, while the other module 32b is attached to the tool side adapter 24.

Also, the air feed modules 34a and 34b are for example a pair of prior known modules for air feed. One module 34a includes an air feed pin 40 provided in a projecting state to supply air such as pressurized air or the like, for example, and the other module 34b includes a socket 42 in which the air feed pin 40 is inserted and which is connected to the air feed pin 40. Then, one module 34a is attached to the robot side adapter 22, and the other module 34b is attached to the tool side adapter 24.

In light of this, the signal feed modules 30a and 30b are modules for an automatic tool exchange device as an embodiment of the present invention, and as the first module, the signal feed module 30a is attached to the robot side adapter 22, and as the second module, the signal feed module 30b is attached to the tool side adapter 24.

Figure 4:
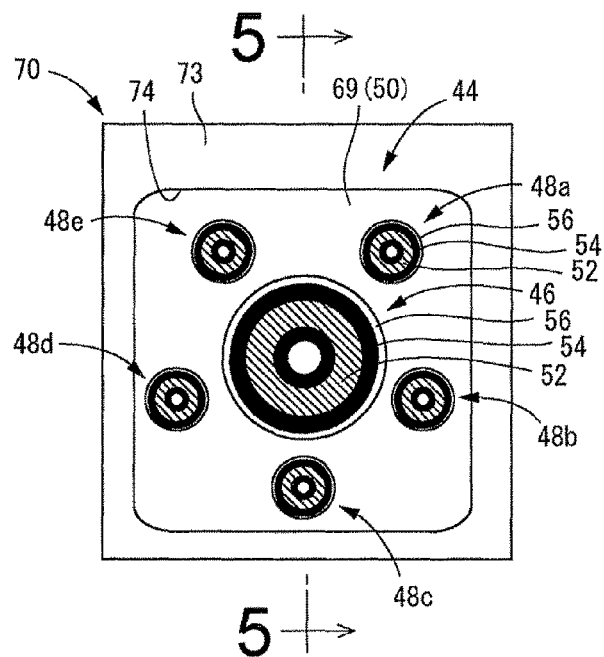
FIG. 4 is a front view showing a coil unit and a holder.
Figure 5:
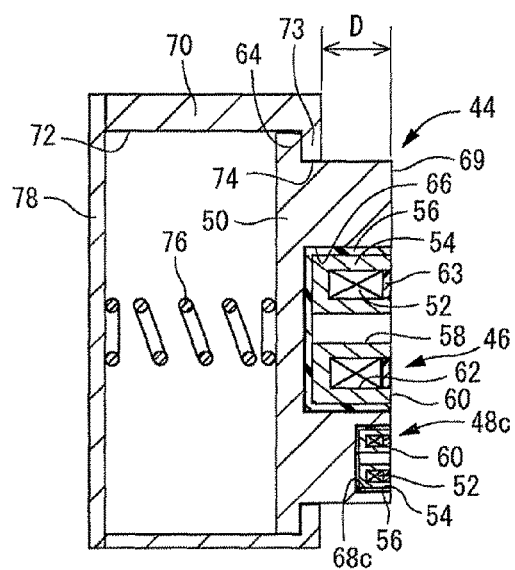
FIG. 5 is a cross section view taken along line 5-5 of FIG. 4.

The signal feed module 30a is equipped with a primary side coil unit 44 shown in model form in FIG. 4 and FIG. 5. The primary side coil unit 44 is constituted with one primary side coil head for power 46 as the coil head for power and a plurality of (with this embodiment, five) primary side coil heads for signals 48a through 48e as the coil heads for signals provided in a case 50 as the electromagnetic shielding member.

The primary side coil head for power 46 is constituted with a gap member 56 attached to the outer circumference of a core member 54 to which a coil member 52 is attached. The core member 54 is a so-called pot-shaped core formed from a ferromagnetic material such as ferrite or the like, for example, and the overall item equipped with a through hole 58 that passes through on the center axis has a roughly round cylinder shape. Furthermore, a lead groove 62 as a circumference groove extending along the entire circumference and opening to one end surface 60 of the axis direction (the lateral direction in FIG. 5) is formed on the core member 54.

Then, the coil member 52 is formed by having a lead wire formed by copper or the like for example inside the lead groove 62 being wound a specified number of times, and this coil member 52 is attached to the core member 54 so as to extend in the circumference direction of the core member 54 along the lead groove 62. By doing this, the magnetic path of the coil member 52 is formed by the core member 54, and the end surface 60 that is the open end surface of the lead groove 62 on the core member 54 is the transmission surface.

Note that in a state with the coil member 52 held, provided at the aperture part of the lead groove 62 is a protective member 63 formed by a material with low magnetic permeability such as epoxy resin or the like for example, and the coil member 52 is protected from contact or the like with other members by the protective member 63.

Furthermore, the outer circumference surface other than the end surface 60 of the core member 54 is covered by the gap member 56. The gap member 56 has a round cylinder shape with a bottom having internal diameter dimensions roughly equal to the outer diameter dimensions of the core member 54, and that open end surface is positioned on the same plane as the end surface 60 of the core member 54 and is fitted to the outside of the core member 54. Then, the primary side coil head for power 46 is constituted including the coil member 52, the core member 54, and the gap member 56.

Here, as the gap member 56, it is possible to suitably use a prior known member with a small electromagnetic shielding effect (shield effect (SE)) in relation to electromagnetism including electric fields and the magnetic fields compared to the case 50, preferably using a member with the shield effect smaller than 30 dB, and more preferably 20 dB or less. For example, as the gap member 56, a member with a low magnetic permeability having non-conductivity can be preferably used, more preferably being a member having a magnetic permeability lower than air. In specific terms, as the gap member 56, examples include polytetrafluoroethylene, epoxy resin, plastic, wood, paper, cloth, a non-conductive coating material, reinforced plastic, glass, natural resin such as rosin, synthetic resin such as phenol or polyurethane or the like. With this embodiment, as the gap member 56, polytetrafluoroethylene is used. By doing this, a gap member 56 is interposed between the outer circumference surface other than the end surface 60 of the core member 54 and the case 50, and direct contact is avoided between the outer circumference surface other than the end surface 60 of the core member 54 and the case 50. As a result, the leaking of magnetic flux from the outer circumference other than the end surface 60 at the core member 54 is inhibited, and also, the occurrence of eddy current at the case 50 due to the effect of magnetic force lines is inhibited, and the risk of a decrease in absorption of electromagnetic energy of the core member 54 by the case 50 and the like is reduced.

Meanwhile, the primary side coil heads for signals 48a through 48e are constituted in roughly the same manner as the primary side coil head for power 46 differing only in that the outer diameter dimensions and axis direction dimensions are smaller than those of the primary side coil head for power 46, so a detailed description is omitted by giving the same code numbers in the drawings to members and sites constituted in roughly the same manner as the primary side coil head for power 46.

Then, the primary side coil head for power 46 and the primary side coil heads for signals 48a through 48e are provided in roughly embedded state on the case 50. The case 50 has a roughly rectangular shaped block shape, and while at one end part in the thickness direction (in FIG. 5, the lateral direction), a flange shaped part 64 projecting to the outside is formed as a single unit along the entire circumference, at the other end part are formed in an open state a circular first aperture part 66 corresponding to the outside shape of the primary side coil head for power 46, and circular second aperture parts 68a through 68e corresponding to the outside shape of the primary side coil heads for signals 48a through 48e. Specifically with this embodiment, the first aperture part 66 is formed at the center part of the case 50, and the second aperture parts 68a through 68e are formed with a roughly equal gap separated on the outside circumference of the first aperture part 66.

Note that as the case 50, it is possible to suitably use a prior known member having a shield effect used as the electromagnetic shielding member for which the electromagnetic shielding effect (shield effect (SE)) is big in relation to electromagnetism including electric fields and magnetic fields in relation to the gap member 56, and preferably to use a member with a shield effect of 30 dB or greater, and more preferably 60 dB or greater. In specific terms, as the case 50, examples include aluminum, copper, iron (including iron oxide), nickel, magnetite, gadolinium, cobalt, a ferrimagnetic body, a conductive powder material, a conductive coating material or the like, and formation can be done by implementing a suitable process on these members such as oxidation or alloying, kneading or vapor deposition of powder or the like.

Then, while the primary side coil head for power 46 is held in the first aperture part 66, the primary side coil heads for signals 48a through 48e are respectively held in the second aperture parts 68a through 68e. In this held state, the primary side coil head for power 46 and the primary side coil heads for signals 48a through 48e are respectively in a state with the end surface 60 of the core member 54 roughly embedded positioned on the same flat plane as an end surface 69 of the case 50, and the outer circumference other than the end surface 60 of the core member 54 is covered by the case 50, and a gap member 56 is interposed between each core member 54 and the case 50.

A primary side coil unit 44 with this kind of constitution, specifically with this embodiment, is provided on a module main unit 71 of the signal feed module 30a via a holder 70. The holder 70 is a box shape of a roughly rectangular shape having an aperture part 72 on the one hand, and a unit push through hole 74 is penetrated in the center part of a bottom part 73 on the opposite side to the aperture part 72.

Then, the primary side coil unit 44 is inserted from the end surface 69 side into the aperture part 72 of the concerned holder 70, and the end surface 60 of the core member 54 is made to go through the unit push through hole 74 and project to outside the holder 70 on the side opposite the aperture part 72. Next, a coil spring 76 is passed through the aperture part 72 and inserted inside the holder 70, and one end part in the axis direction of the coil spring 76 is put into contact with the primary side coil unit 44. Then, the aperture part 72 of the holder 70 is covered by adhering or using set screws or the like a plate shaped lid member 78, and the coil spring 76 is compressed and deformed between the lid member 78 and the primary side coil unit 44. By doing this, by the restoration force of the coil spring 76, an energizing force is applied toward the outside of the holder 70 in relation to the primary side coil unit 44. Then, by the flange shaped part 64 of the primary side coil unit 44 being locked to the bottom part 73 of the holder 70, flying off from the holder 70 of the primary side coil unit 44 is prevented, and the primary side coil unit 44 is held on the holder 70 in a state with the end surface 60 of the core member 54 projecting from the holder 70, and the maximum projection volume: D from the holder 70 of the primary side coil unit 44 is stipulated. In this way, with this embodiment, a locking part is constituted by the flange shaped part 64 of the primary side coil unit 44 and the bottom part 73 of the holder 70.

Here, this maximum projecting volume: D is preferably set to be larger than the maximum separation volume in the direction facing opposite that can occur between the signal feed modules 30*a* and 30*b* in cases such as when for example the arm member 16 is moved at high speed or the like and a large acceleration is applied to the tool changer 10 in a state with the robot side adapter 22 and the tool side adapter 24 coupled.

Then, the primary side coil unit 44 is supported on the holder 70 to be able to be displaced to the inward direction of the holder 70 by the axis direction of the core member 54 by a distance equal to the maximum projection volume: D, and specifically with this embodiment, by the outer circumference surface of the case 50 being guided by the inner circumference surface of the unit push through hole 74, the slipping of the primary side coil unit 44 is reduced. In this way, with this embodiment, the energizing member is constituted including the coil spring 76, the flange shaped part 64, and the bottom part 73, and by this energizing member, an elastic support member for supporting the primary side coil unit 44 in a displaceable manner is constituted.

Note that the holder 70 and the lid member 78 are preferably formed from the same electromagnetic shielding member as the case 50. By working in this way, it is possible to obtain an electromagnetic shielding effect by the holder 70 and the lid member 78, and it is possible to further reduce the effect of noise.

Figure 6:
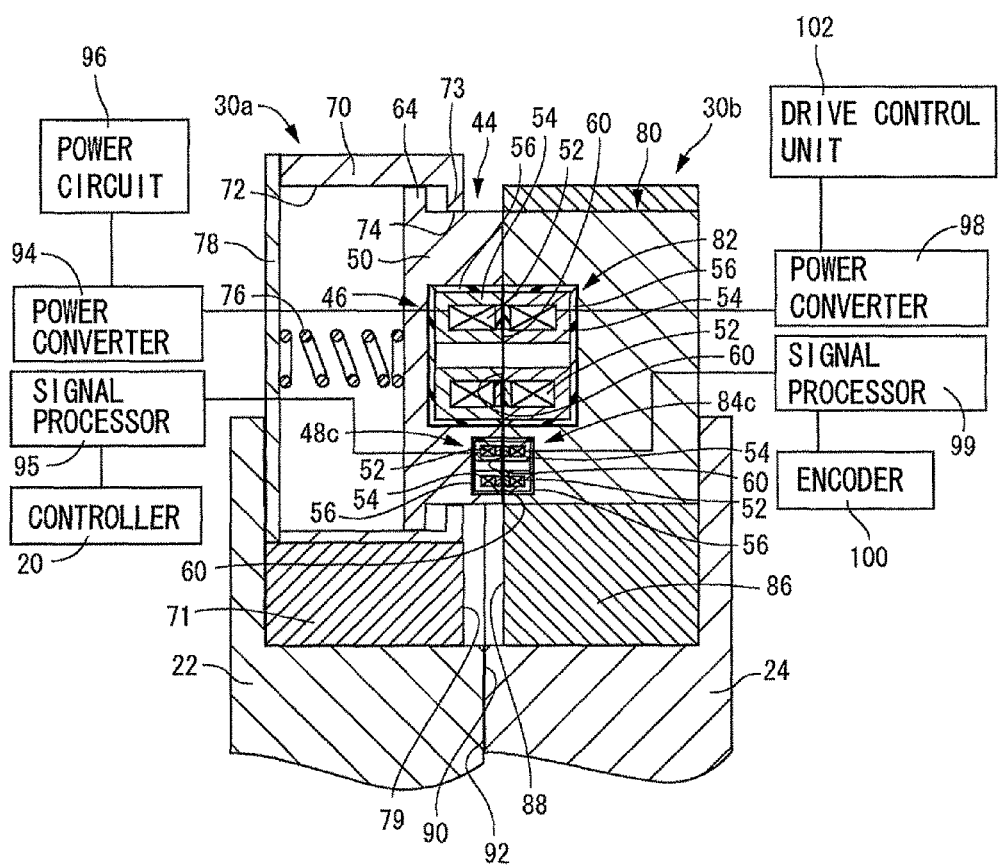
FIG. 6 is an enlarged cross section view of key parts of the automatic tool exchange device.

By attaching this holder 70 to the module main unit 71 of the signal feed module 30*a*, the primary side coil unit 44 is provided to the signal feed module 30*a* in a state projecting from an end surface 79 (see FIG. 6) of the module main unit 71. Then, this signal feed module 30*a* is attached detachably by a set screw or the like to the robot side adapter 22.

Meanwhile, on the signal feed module 30*b* that is attached to the tool side adapter 24 and is part of a pair with the signal feed module 30*a*, a secondary side coil unit 80 is provided. The secondary side coil unit 80 has roughly the same constitution as the primary side coil unit 44 described above provided on the signal feed module 30*a*, so by giving the same code numbers in the drawings to members and sites with roughly the same constitution as the primary side coil unit 44, we are omitting a detailed description of those, but for the secondary side coil unit 80, the constitution has one secondary side coil head for power 82 as the coil head for power and a plurality of (with this embodiment, five) secondary side coil heads for signals 84*a* through 84*e* as the coil heads for signals provided on the case 50. These secondary side coil head for power 82 and secondary side coil heads for signals 84*a* through 84*e* are, with the robot side adapter 22 and the tool side adapter 24 in a coupled state, respectively arranged at positions with the primary side coil head for power 46 and the primary side coil heads for signals 48*a* through 48*e* provided on the signal feed module 30*a* facing opposite. Note that with the secondary side coil unit 80, in contrast with the signal feed module 30*a* described above, the case 50 is fixed not via the holder 70, but rather directly on a module main unit 86 of the signal feed module 30*b*, and the end surface 60 of the core member 54 of the secondary side coil head for power 82 and secondary side coil heads for signals 84*a* through 84*e* is positioned on the same flat plane as an end surface 88 of the module main unit 86 (see FIG. 6). Then, this signal feed module 30*b* is attached detachably using a set screw or the like to the tool side adapter 24.

While the robot side adapter 22 with this kind of constitution is attached to the arm member 16, the tool side adapter 24 is attached to the tool 18. Then, by mutually coupling the robot side adapter 22 and the tool side adapter 24, the tool 18 is attached to the arm member 16, and also, as shown in model form in FIG. 6, the signal feed modules 30*a* and 30*b* are positioned facing opposite each other.

In this opposite facing state, the end surfaces 60 of the respective core member 54 of the primary side coil head for power 46 and of the primary side coil heads for signals 48*a* through 48*e* of the signal feed module 30*a*, and the end surfaces 60 of the respective core member 54 of the secondary side coil head for power 82 and of the secondary side coil heads for signals 84*a* through 84*e* of the signal feed module 30*b* are positioned in the opposite facing direction of the signal feed modules 30*a* and 30*b*, the different way, facing opposite each other in the axis direction of the core member 54. In light of this, the end surfaces 79 and 88 of the signal feed modules 30*a* and 30*b* are respectively positioned on different flat planes from an end surface 90 of the robot side adapter 22 and an end surface 92 of the tool side adapter 24, and even when the end surfaces 90 and 92 of both adapters 22 and 24 are in a contact state with each other, a specified gap is formed between the end surfaces 79 and 88 of both modules 30*a* and 30*b*. However, with this embodiment, from the fact that the primary side coil unit 44 of the signal feed module 30*a* is projecting facing the signal feed module 30*b*, it is possible to have the end surfaces 60 of the core member 54 of both the coil units 44 and 80 be in contact with each other.

Then, for example a lead wire constituting the coil member 52 of the primary side coil head for power 46 is in electrical contact with a power circuit 96 via a power converter 94, and also, a lead wire constituting the coil member 52 of the primary side coil head for signals 48*c* is electrically connected to the controller 20 provided on the main unit side of the robot 12 via a signal processor 95. Meanwhile, a lead wire constituting the coil member 52 of the secondary side coil head for power 82 is electrically connected to a drive control circuit 102 for controlling the operation of the tool 18 provided on the tool 18 via a power converter 98, and also, the lead wire constituting the coil member 52 of the secondary side coil head for signals 84*c* is electrically connected to an encoder 100 for generating as signals position information and the like of the tool 18 via a signal processor 99. Here, the power converter 94 and the signal processor 99 are respectively equipped with CVCF type and VVVF type prior known inverters and rectifying and stabilization circuits and the like.

With the signal feed modules 30*a* and 30*b* constituted in this way, electric signals are made to be transmitted between the primary side coil heads for signals 48*a* through 48*e* provided on the primary side coil unit 44 and the secondary side coil heads for signals 84*a* through 84*e* provided on the secondary side coil unit 80. For example, when encoding signals from an encoder 100 are transmitted as electrical signals to the controller 20 provided on the main unit side of the robot 12, first, after the encoding signals generated by the encoder 100 are superimposed on high frequency voltage by the signal processor 99, these are supplied to the coil member 52 of the secondary side coil head for signals 84*c*. Note that the high frequency voltage on which the electrical signals are superimposed are generated by the signal processor 99, and that frequency is different by the electrical signal data size, use environment and the like, but with this embodiment, this is set as appropriate within a range of approximately 100 Hz to 1 GHz.

Then, by high frequency voltage being fed to the coil member 52 of the secondary side coil head for signals 84c, magnetic flux is generated that penetrates the coil member 52 and changes according to the output frequency. The magnetic flux that penetrates the coil member 52 goes through the core member 54 of the secondary side coil head for signals 84c, enters the end surface 60 of the core member 54 of the primary side coil head for signals 48c positioned facing opposite from the end surface 60 of the core member 54, and passes through the core member 54 of the primary side coil head for signals 48c. Then, the magnetic flux that passes through the core member 54 of the primary side coil head for signals 48c is linked with the coil member 52 of the primary side coil head for signals 48c.

As a result, the coil member 52 of the secondary side coil head for signals 84c and the coil member 52 of the primary side coil head for signals 48c are electromagnetically coupled, induced electromotive force is generated at the coil member 52 of the primary side coil head for signals 48c by the mutual induction effect, and the high frequency voltage supplied to the coil member 52 of the secondary side coil head for signals 84c is taken from the coil member 52 of the primary side coil head for signals 48c. Then, the encoding signals superimposed on the high frequency voltage taken from the coil member 52 of the primary side coil head for signals 48c, after being taken by the signal processor 95, are sent to the controller 20. By doing this, it is possible to perform transmission of electrical signals between the signal feed modules 30a and 30b, and with this, it is possible to perform transmission of electrical signals between the robot side adapter 22 and the tool side adapter 24.

Furthermore, with this embodiment, transmission of power is performed between the primary side coil head for power 46 provided on the primary side coil unit 44 and the secondary side coil head for power 82 provided on the secondary side coil unit 80. This power transmission is performed in roughly the same way as the transmission of electrical signals described above, to give a summary explanation, for example a direct current voltage of the power circuit 96 provided on the main unit side of the robot 12 is converted to high frequency voltage by the power converter 94. Note that the frequency (output frequency) of the high frequency voltage converted by the power converter 94 differs by the supplied power, use environment and the like, but with this embodiment, it is set as appropriate within a range of approximately 100 Hz to 1 MHz.

Then, the high frequency voltage converted by the power converter 94 is supplied to the coil member 52 of the primary side coil head for power 46, and induced electromotive force is generated at the coil member 52 of the secondary side coil head for power 82 positioned facing opposite the primary side coil head for power 46. By doing this, the high frequency voltage supplied to the coil member 52 of the primary side coil head for power 46 is taken from the coil member 52 of the secondary side coil head for power 82, and this high frequency voltage, after being converted to direct current voltage by the power converter 98, is supplied as the drive voltage of the drive control circuit 102. In this way, it is possible to perform power transmission between the signal feed modules 30a and 30b, and with this, it is possible to perform power transmission between the robot side adapter 22 and the tool side adapter 24.

As is clear from the description above, with this embodiment, an opposite facing type interface is constituted from the primary side coil unit 44 and the secondary side coil unit 80. In light of this, with this embodiment, by projecting the primary side coil unit 44 from the module main unit 71 to the secondary side coil unit 80, the end surfaces 60 of the core members 54 of both coil units 44 and 80 can be placed facing each other in a mutual contact state. By doing this, it is possible to perform higher reliability transmission. Then, for example, when the arm member 16 is moved at high speed and both modules 30a and 30b are displaced in the separation direction to each other, by having the primary side coil unit 44 further projected by the energizing force of the coil spring 76, it is possible to maintain the contact state of the end surfaces 60 of both core members 54. Also, transmission between both coil units 44 and 80 is performed using electromagnetic induction, so even in cases when for some reason there is an even greater separation of both modules 30a and 30b, and the end surfaces 60 of both core members 54 are in a mutual non-contact state, it is possible to perform transmission of electrical signals and power, and there is a reduced risk of the contact failure that happens with pin contact points.

In addition, with this embodiment, by arranging the case 50 with a high electromagnetic shielding effect on the outside of the core member 54, there is a reduced risk of magnetic force lines leaked from the core member 54 affecting other electronic apparatuses, and of the magnetic force lines from the other electronic apparatuses affecting the electromagnetic inductance effect between both coil units 44 and 80. Furthermore, specifically with this embodiment, by interposing the gap member 56 between the outer circumference of each core member 54 and the case 50, it is possible to inhibit leaking of magnetic flux that passes through the inside of the core member 54 from the outer circumference of the core member 54, and it is possible to focus the magnetic flux on the end surface 60, and also, it is possible to reduce the risk of a decrease in absorption of the electromagnetic energy of each core member 54 by the case 50 and the like, and it is possible to perform more stable transmission.

Also, the signal feed modules 30a and 30b of this embodiment make it possible to transmit electrical signals and power simply by positioning the end surfaces 60 of the core member 54 provided at both coil units 44 and 80 facing opposite each other, so high level alignment like with pin contact points is unnecessary. By doing this, it is possible to more easily couple the robot side adapter 22 and the tool side adapter 24, and it is possible to make tool exchange work even more efficient. In addition, from the fact that a physical connection like that of pin contact points is unnecessary, it is possible to improve the durability of the tool changer 10 for which coupling and uncoupling are performed many times and frequently.

Figure 7:
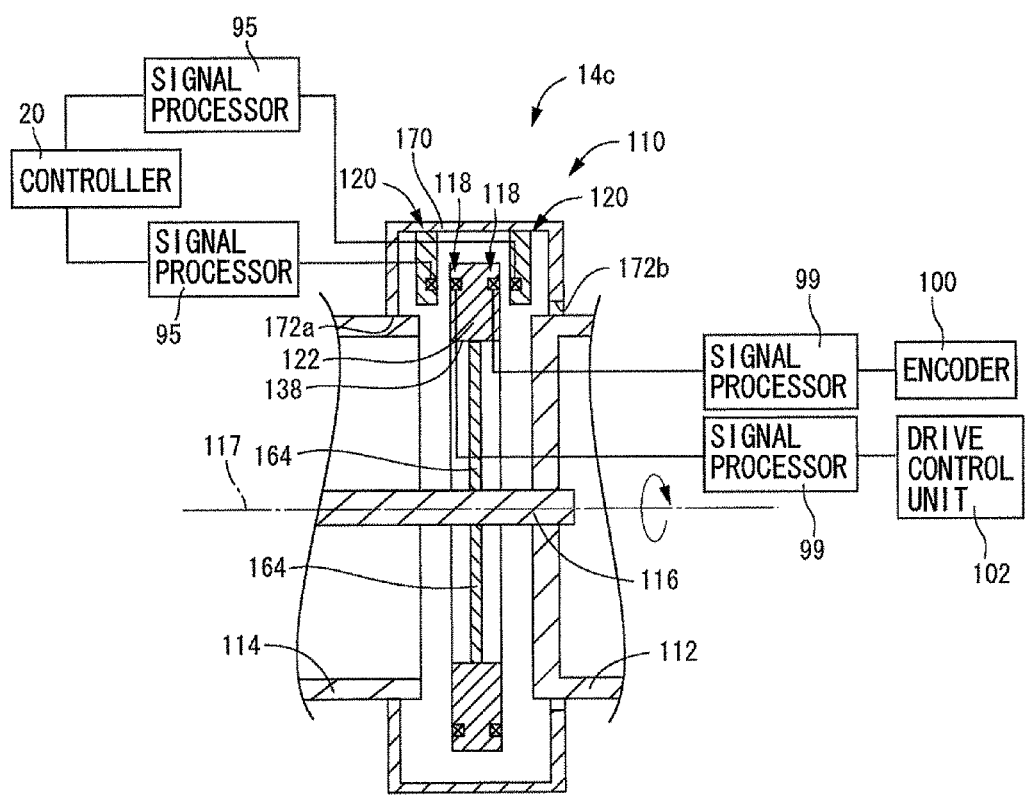
FIG. 7 is a cross section view showing a harnessless device.

Note that in addition to the tool changer 10 as described above, on the robot 12 of this embodiment, provided on the joint 14c is a movable type transformer 110 as the harnessless device. FIG. 7 shows in model form the joint 14c of the arm member 16. The joint 14c has a constitution with a tool side arm member 112 as the first member and a main unit side arm member 114 as the second member constituting the arm member 16 coupled by a rotation axis 116. In light of this, while the tool side arm member 112 is positioned at the tool 18 side of the robot 12, the main unit side arm member 114 is positioned at the main unit side of the robot 12. Then, with the rotation axis 116, while one end part is coupled in fixed form to the tool side arm member 112, the other end part is projecting from the tool side arm member 112 facing the main unit side arm member 114, and is able to rotate around a center axis 117 coupled with an output axis of a drive source such as an electromotive motor (not illustrated) provided on the main unit side arm member 114 side. By doing this, the tool side arm member 112 is able to rotate relative to the main unit side arm member 114 around the center axis 117 of the rotation axis 116.

Then, provided on this joint 14c is the movable type transformer 110. The movable type transformer 110 is constituted including a tool side coil unit 118 as the first coil unit attached to the tool side arm member 112 via the rotation axis 116, and a main unit side coil unit 120 as the second coil unit attached to the main unit side arm member 114, and specifically with this embodiment, a pair of the tool side coil units 118, and a pair of the main unit side coil units 120.

Figure 8:
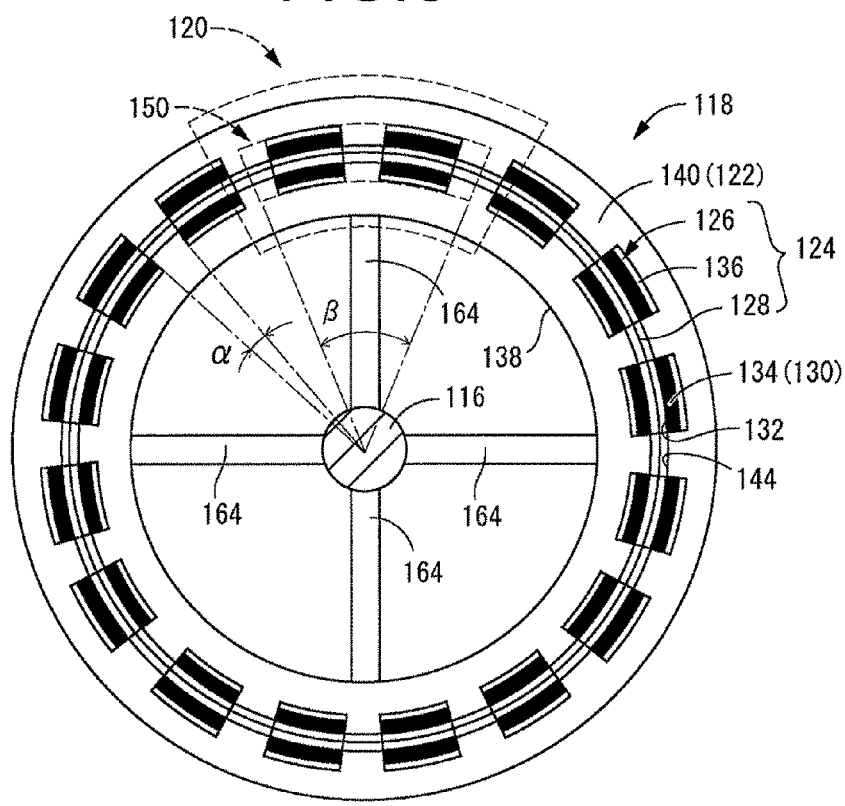
FIG. 8 is a view showing a first coil unit constituting the harnessless device.
Figure 9:
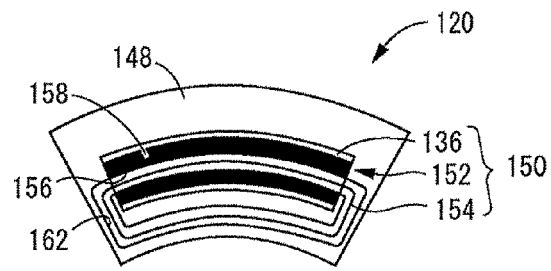
FIG. 9 is a view showing a second coil unit constituting the harnessless device.
Figure 10:
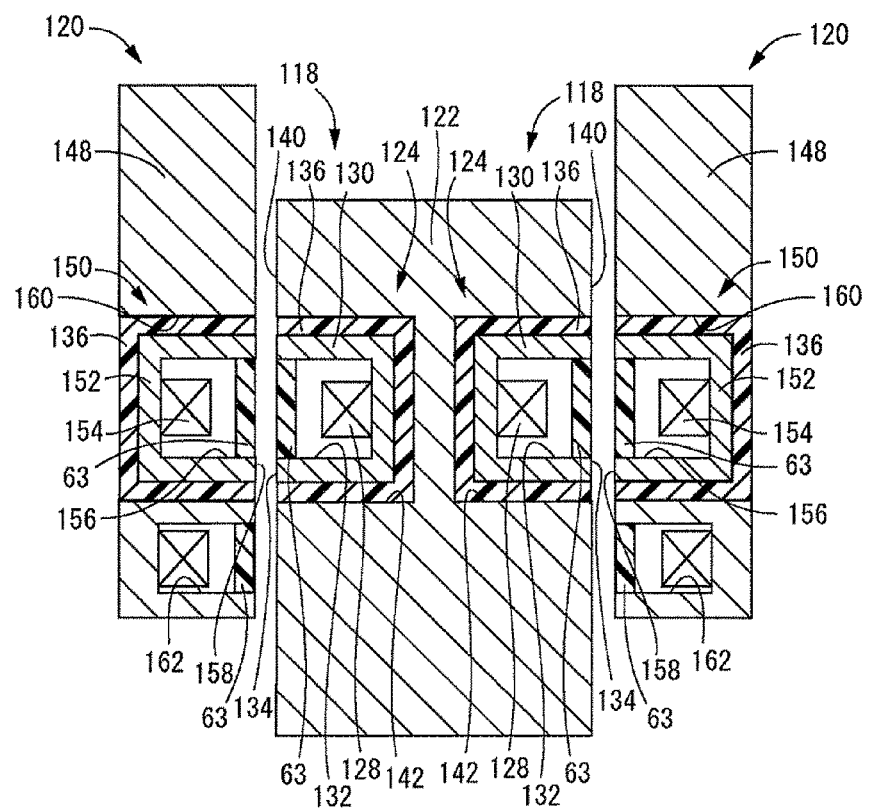
FIG. 10 is an enlarged cross section view of key parts of the harnessless device.

Respectively shown enlarged in model form are the tool side coil unit 118 in FIG. 8, the main unit side coil unit 120 in FIG. 9, and enlarged facing parts of the tool side coil unit 118 and the main unit side coil unit 120 in FIG. 10. Note that in FIG. 8, to make it easier to understand, the main unit side coil unit 120 is shown together with dotted lines, and in FIG. 8 and FIG. 9, the protective member 63 is omitted from the drawing.

The tool side coil unit 118 is constituted with a disk 122 as the first support member and a tool side coil head 124 as the first coil head attached. Furthermore, the tool side coil head 124 is constituted with a tool side core 126 as the first core member and a tool side coil 128 as the first coil member attached.

The tool side core 126 is constituted by a partial core 130 as a plurality of partial core members. The partial core 130 is formed from a ferromagnetic material such as ferrite, for example, has a fixed U shaped cross section having a lead groove 132 that opens at one end orthogonal to the lengthwise direction, and has a shape extending in an arc shape along a specified dimension. Specifically with this embodiment, each partial core 130 has the same shape as each other, and has an arc shape having a mutually equal curvature and circumference direction length.

Furthermore, specifically with this embodiment, the outer circumference surface except for an open end surface 134 of each partial core 130 and both end surfaces in the lengthwise direction is covered by a cover member 136 as a low shielding effect member. Roughly the same way as with the partial core 130, the cover member 136 has a fixed U shaped cross section having a lead groove 132 that opens in one of the directions orthogonal to (in FIG. 10, the lateral direction) the lengthwise direction and has a shape extending in an arc shape along a specified dimension. Then, this cover member 136 has its open end surface positioned on the same flat plane as the open end surface 134 of the partial core 130, and this is fitted to the outside of the partial core 130. By doing this, the cover member 136 is arranged on the outer circumference except for the open end surface 134 of the partial core 130.

Note that as the cover member 136, it is possible to suitably use a prior known member with a small electromagnetic shielding effect (shield effect (SE)) in relation to electromagnetism including electric fields and magnetic fields, and it is possible to favorably use the same member as the gap member 56 with the aforementioned tool changer 10.

Then, the partial core 130 and the cover member 136 are arranged in a state embedded on the disk 122. The disk 122 is in a round disk shape having an axis insertion push through hole 138 penetrating through in the thickness direction. In light of this, with this embodiment, the disk 122 is a high shielding effect member. As this disk 122, it is possible to suitably use a prior known member for which the electromagnetic shield effect (shield effect (SE)) is large in relation to electromagnetism including electrical fields and magnetic fields, and having a shield effect that can be used as the electromagnetic shielding member, and it is possible to favorably use the same member as the case 50 for the aforementioned tool changer 10.

Furthermore, on the disk 122, at the partial core 130 arrangement site is formed a concave groove 142 that opens at an end surface 140 of the axis direction (in FIG. 10, the lateral direction). Specifically with this embodiment, the concave groove 142 has a shape corresponding to the outside shape of the cover member 136, and has equal depth dimensions to the height dimensions of the cover member 136 (in FIG. 10, the lateral direction dimensions), and also, has an equal curvature to the curvature of the cover member 136 and the partial core 130 and a shape that extends in an arc shape. A plurality of this concave grooves 142 are formed at each specified gap in the circumference direction of the disk 122, and on each of these concave grooves 142, partial core 130 is fitted in via the cover member 136 and fixed by adhesion or the like.

Working in this way, the disk 122 includes a plurality of partial cores 130 that are provided with a specified interval separated on the same circumference for which the center axis is aligned with that of the disk 122, and the tool side core 126 is formed by this plurality of partial cores 130. By doing this, the tool side core 126 is a pot core shape divided at a plurality of locations in the circumference direction. Specifically with this embodiment, the tool side core 126 is divided at equal intervals in the circumference direction with all the intervals of the adjacent partial cores 130 in the circumference direction equal. Note that the intervals of the adjacent partial cores 130 in the circumference direction, specifically with this embodiment, are smaller than the circumferential direction length of the partial core 130. In specific terms, the center angle: $\alpha$ around the curve center axis of the partial core 130 is set to <45°. Also, by having the partial core 130 and the cover member 136 fitted into the concave groove 142, the open end surface 134 of the partial core 130 and the end surface of the cover member 136 are positioned on the same flat plane as the end surface 140 of the disk 122. Furthermore, the disk 122 is arranged via the cover member 136 on the outer circumference except for the open end surface 134 of the partial core 130.

Then, a lead wire formed from copper or the like, for example, straddles the lead groove 132 of the partial core 130 provided on the disk 122, the tool side coil 128 is formed by winding a specified number of times so as to extend in the circumference direction of the disk 122, and this tool side coil 128 is attached to the tool side core 126. Note that a lead groove 144 having the same cross section shape as the lead groove 132 and open at the end surface 140 is formed between each partial core 130 in the circumference direction of the disk 122, and by this lead groove 144 and the lead groove 132 of the partial core 130 being connected, a circumference groove is formed open at the end surface 140 of the disk 122 and extending continuously in the whole circumference in the circumference direction. Then, by arranging the lead wire inside the circumference groove formed by these lead grooves 132 and 144, the tool side coil 128 is arranged without projecting from the end surface 140 of the disk 122. Also, in FIG. 8, to make it easy to understand, the tool side coil 128 is shown with one lead wire, but it is possible to set the lead wire wind count as appropriate considering the required transmission characteristics.

Furthermore, the same as with the core member 54 of the aforementioned tool changer 10, at the aperture part of the lead groove 132 of each partial core 130 and the lead groove 144 of the disk 122, by providing the protective member 63, contact of the tool side coil 128 with other members or the like is prevented.

Working in this way, the tool side coil head 124 is formed including the tool side core 126, the tool side coil 128, and the cover member 136, and by having this tool side coil head 124 supported on the disk 122, the tool side coil unit 118 is constituted. Then, the magnetic path of the tool side coil 128 is formed by the tool side core 126, to say it another way, the partial core 130, and also, the open end surface 134 of the partial core 130 is the first transmission surface.

Note that specifically with this embodiment, the concave groove 142 is formed respectively on both end surfaces 140 of the disk 122, the cover member 136 and the partial core 130 are fitted into each of these concave grooves 142, and the tool side coil head 124 is formed. As is clear from this, with this embodiment, the pair of tool side coil heads 124 having the diameter dimensions equal to each other are supported on a concentric axis by the common disk 122, and a pair of tool side coil units 118 are provided as a single unit with the disk 122 in common.

The pair of main unit side coil units 120 are respectively arranged on both sides in the thickness direction of the tool side coil unit 118 constituted in this way. As shown in FIG. 9, the main unit side coil unit 120 is constituted with a main unit side coil head 150 as the second coil head attached to a pad 148 as the second support member. Also, the main unit side coil head 150 is constituted with a main unit side core 152 as the second core member and a main unit side coil 154 as the second coil member attached, and the cover member 136 fitted into the outside of the main unit side core 152.

The main unit side core 152 is constituted in roughly the same way as the partial core 130 with the circumference direction length of the partial core 130 constituting the tool side coil head 124 being different, and is formed from a ferromagnetic material such as ferrite, for example, and has a fixed U shaped cross section having a lead groove 156 and a shape extending in an arc shape with a curvature equal to the partial core 130. In light of that, as shown in FIG. 8, the circumference direction length dimension of the main unit side core 152 is larger than the separation distance in the circumference direction of the partial cores 130 adjacent in the circumference direction on the tool side coil head 124, and specifically with this embodiment, the center angle: β around the curvature center axis of the main unit side core 152 is set to >45°.

Furthermore, the same as with the partial core 130, the cover member 136 is fitted onto the outside of the main unit side core 152 specifically with this embodiment, and the outside circumference surface except for an open end surface 158 of the main unit side core 152 and both end surfaces in the lengthwise direction is covered by the cover member 136.

Meanwhile, the pad 148 has a plate shape, and specifically with this embodiment, the thickness dimensions of the pad 148 (in FIG. 10, the lateral direction dimensions) are equal to the height dimensions of the cover member 136. Also, a through hole 160 that penetrates in the thickness direction is formed on the pad 148. Note that the same as the disk 122 that supports the tool side coil head 124, the pad 148 is a high shielding effect member formed from a member such as the aforementioned examples with a high electromagnetic shielding effect.

Then, the cover member 136 and the main unit side core 152 are fitted into this through hole 160 and fixed by adhesion or the like. In light of this, from the fact that the thickness direction dimensions of the pad 148 and the height dimensions of the cover member 136 are equal, it is possible to easily align the open end surface 158 of the main unit side core 152 consisting the main unit side coil head 150 and the end surface of the pad 148. Then, at the outer circumference part except for the open end surface 158 of the main unit side core 152 is arranged the pad 148 via the cover member 136.

Also, on the pad 148 is formed a lead groove 162 connected to the lead groove 156 of the main unit side core 152 arranged inside the through hole 160 and forming the circumference groove continuous on the entire circumference working cooperatively with the lead groove 156. Then, the lead wire formed by copper or the like, for example, is arranged inside the circumference groove formed by these lead grooves 156 and 162, and the main unit side coil 154 is formed by winding the lead wire a specified number of times on the main unit side core 152, and this main unit side coil 154 is attached to the main unit side core 152. Note that in FIG. 9, to make it easy to understand, the main unit side coil 154 is shown by one lead wire, but it is possible to set the number of lead wire coils as appropriate considering the required transmission characteristics or the like. Also, though omitted in the drawing in FIG. 9, the protective member 63 is provided the same as with the tool side coil unit 118 on the aperture part of the lead groove 156 of the main unit side core 152 and the lead groove 162 of the pad 148, and contact with the other members of the main unit side coil 154 or the like is prevented.

Working in this way, the main unit side coil head 150 is formed including the main unit side core 152, the main unit side coil 154, and the cover member 136, and this main unit side coil head 150 is supported by the pad 148. Then, the magnetic path of the main unit side coil 154 is formed by the main unit side core 152, and also, the open end surface 158 of the main unit side core 152 is the second transmission surface.

Then, the respective pair of tool side coil units 118 and pair of main unit side coil units 120 are attached to the tool side arm member 112 and the main unit side arm member 114, and at both sides in the thickness direction of the disk 122 the pair of main unit side coil units 120 are respectively positioned with a specified distance separated.

In more detail, the tool side coil unit 118, in a state with the rotation axis 116 pushed through on the center axis of the axis insertion push through hole 138 of the disk 122, has a plurality (with this embodiment, four) of coupling members 164 extending toward the disk 122 from the outer circumference surface of the rotation axis 116 and is fixed to the rotation axis 116 by the coupling members 164. By doing this, the tool side coil unit 118 is attached to the tool side arm member 112 via the rotation axis 116 and has the tool side core 126 positioned on the same axis as the center axis 117 of the rotation axis 116. And also, the tool side coil unit 118 is made to rotate as a single unit with the rotation axis 116 and the tool side arm member 112 around the center axis 117 of the rotation axis 116.

Then, while one lead wire constituting the pair of tool side coils 128 provided at the tool side coil unit 118 is electrically connected via the previously described signal processor 99 with the drive control circuit 102 that controls the operation of the tool 18, for example, the other lead wire constituting the pair of tool side coils 128 is electrically connected via the signal processor 99 to the encoder 100, for example.

Meanwhile, the pair of main unit side coil units 120 is attached to the main unit side arm member 114 via a shield member 170 provided as a single unit with the main unit side arm member 114. The shield member 170 has a hollow roughly round cylinder shape, and at the center part of both end surfaces in the axis direction (in FIG. 7, the lateral direction), push through holes 172a and 172b are respectively formed penetrating in the thickness direction. This shield member 170 is fixed to the main unit side arm member 114 in a state with the main unit side arm member 114 pushed through in one push through hole 172a. Note that the shield member 170, the same as with the disk 122 and the pad 148, is a high shielding effect member formed from a member like the examples listed above with a high electromagnetic shielding effect or the like.

On the inner circumference surface of this shield member 170 is attached the pair of main unit side coil units 120 so as to project inward in the diameter direction of the shield member 170, and also, the respective lead wires constituting the main unit side coil 154 provided on the main unit side coil unit 120 are electrically connected to the controller 20 provided on the main unit side of the robot 12 via the signal processor 95.

Then, by the tool side arm member 112 being pushed through in the other push through hole 172b of the shield member 170, the tool side coil unit 118 and pair of main unit side coil units 120 are positioned facing opposite each other within the shield member 170. Note that specifically with this embodiment, the diameter dimensions of the tool side coil unit 118 are larger than the diameter dimensions of the push through hole 172b of the shield member 170, so the arrangement of the tool side coil unit 118 inside the shield member 170 can be realized, for example, by having the shield member 170 have a divided constitution in the circumference direction, and after attaching the tool side arm member 112 to which the tool side coil unit 118 is attached to the main unit side arm member 114, by attaching the divided structural body constituting the shield member 170 from the outside of both these arm members 112 and 114 or the like.

By doing this, the pair of the tool side coil units 118 and the pair of the main unit side coil units 120 are arranged inside the shield member 170, and the disk 122 that supports the pair of tool side coil units 118 is sandwiched from both sides of the axis direction of the rotation axis 116 by the pair of main unit side coil units 120 that are arranged at opposite sides to each other. Then, the open end surface 134 of the partial core 130 that is the transmission surface of the tool side coil unit 118 and the open end surface 158 of the main unit side core 152 that is the transmission surface of the main unit side coil unit 120 are positioned facing opposite each other in a non-contact state separated by a specified distance in the axis direction of the rotation axis 116. Working in this way, the movable type transformer 110 is constituted including this pair of tool side coil units 118 and the pair of main unit side coil units 120.

With a movable type transformer 110 constituted in this way, transmission of electrical signals is performed in a mutually non-contact state between the tool side coil unit 118 and the main unit side coil unit 120. For example, when encoding signals from the encoder 100 provided on the tool 18 as the electrical signals are transmitted to the controller 20 provided on the main unit side of the robot 12, first, the encoding signals generated by the encoder 100 are superimposed on high frequency voltage by the signal processor 99, after which they are supplied to the tool side coil 128 of the tool side coil unit 118. Note that the high frequency voltage on which the electrical signals are imposed are generated by the signal processor 99, and that frequency differs according to the electrical signal data size, the use environment and the like, but with this embodiment, this is set as appropriate within a range of approximately 100 Hz to 1 GHz.

Then, by the high frequency voltage being fed to the tool side coil 128, magnetic flux that passes through the tool side coil 128 and changes according to the output frequency is generated. The magnetic flux that passes through the tool side coil 128 passes through the tool side core 126, more specifically, the partial core 130 that constitutes the tool side core 126, enters from the open end surface 134 of the partial core 130 to the open end surface 158 of the main unit side core 152 positioned facing opposite, and passes through the main unit side core 152. Then, the magnetic flux that passes through the main unit side core 152 is linked with the main unit side coil 154.

As a result, the tool side coil 128 and the main unit side coil 154 are electromagnetically coupled, induced electromotive force is generated at the main unit side coil 154 by the mutual induction effect, and the high frequency voltage supplied to the tool side coil 128 is taken in a non-contact state from the main unit side coil 154. Then, the encoder signals superimposed on the high frequency voltage taken from the main unit side coil 154, after being taken by the signal processor 95, is sent to the controller 20. By doing this, it is possible to perform transmission of electrical signals in a mutual non-contact state between the tool side arm member 112 and the main unit side arm member 114.

Also, the movable type transformer 110 is also able to send electrical signals from the main unit side of the robot 12 to the tool 18 side. For example, in the case of transmitting drive control signals of the controller 20 as the electrical signals to the drive control circuit 102 provided on the tool 18, with the signal delivery path the reverse of when sending encoded signals to the controller 20 from the encoder 100 described above, roughly in the same way, the drive control signals generated at the controller 20 are superimposed on high frequency voltage by the signal processor 95 connected to the controller 20, and after being sent in a non-contact state via the main unit side core 152 and the tool side core 126 to the tool side coil 128 from the main unit side coil 154, they are taken from the high frequency voltage by the signal processor 99 provided on the tool 18 side, and are sent to the drive control circuit 102.

Then, with the movable type transformer 110 according to this embodiment, when the rotation axis 116 is rotated, the tool side coil unit 118 provided in a fixed manner to the rotation axis 116 is rotated around the center axis 117 of the rotation axis 116 in relation to the main unit side coil unit 120, and the open end surface 158 of the main unit side core 152 is rotated relatively around the center axis 117 of the rotation axis 116 in relation to the open end surface 134 of each partial core 130 constituting the tool side core 126. There, with the movable type transformer 110 according to this embodiment, the partial cores 130 constituting the tool side core 126 are arranged on the concentric circle with the center axis 117, and also, the circumference direction dimensions of the main unit side core 152 are larger than the separation distance of the adjacent partial cores 130 in the partial core 130 arrangement circle direction, so in whatever circumference direction position in relation to the tool side coil unit 118 the main unit side core 152 is, the open end surface 158 of the main unit side core 152 is positioned facing opposite the open end surface 134 of at least one partial core 130. By doing this, when the rotation axis 116 is rotated, specifically, even when the tool side arm member 112 is rotated in relation to the main unit side arm member 114, the electromagnetic coupled state of the tool side core 126 and the main unit side core 152 is maintained, and it becomes possible to transmit electrical signals between the main unit side arm member 114 and the tool side arm member 112, and it is possible to endlessly rotate the tool side arm member 112 while maintaining the electrical connection in relation to the main unit side arm member 114.

In light of this, the tool side core 126 and the main unit side core 152 are separated by a specified distance in the axis direction of the rotation axis 116 and in a non-contact state, so it is possible to avoid the risk of wear due to rubbing of both cores 126 and 152 or the like, and it is also possible to avoid the risk of breaking due to repeated curving or the like such as with a cable connection or the like, so it is possible to obtain excellent maintainability.

Also, since it is not necessary to provide deflection that allows relative displacement of each member such as with cable connections, it is possible to have a compact constitution for the movable type transformer 110, and thus, it is possible to make the robot 12 more compact. Furthermore, specifically with this embodiment, by providing the pair of tool side cores 126 having the same diameter dimensions as each other respectively on the same axis on both surfaces of the disk 122, it is possible to arrange two sets of the tool side coil unit 118 and the main unit side coil unit 120 set with good space efficiency. Specifically, when two tool side cores 126 are provided on one surface of the disk 122, the diameter dimensions of those tool side cores 126 are made to be different from each other, and it is necessary to arrange the tool side core 126 with a large diameter on the outside of the tool side core 126 with the small diameter, so the diameter dimensions of one of the tool side cores 126 has to be made larger, making the size larger in scale, and in particular, bringing on a larger scale in the direction orthogonal to the axis direction of the rotation axis 116. Meanwhile, without providing a pair of tool side cores 126 on one disk 122, but rather providing only one tool side core 126 on one disk 122, when arranging with two sets of the tool side coil unit 118 and the main unit side coil unit 120 set simply aligned in the axis direction of the rotation axis 116, this brings on a larger scale in the axis direction of the rotation axis 116. In light of this, with this embodiment, by respectively providing the tool side cores 126 on both surfaces of the disk 122, it is possible to have the diameter dimensions of the pair of tool side cores 126 be mutually equal and to make the size for both the axis direction and the axis-perpendicular direction of the rotation axis 116 be more compact.

Furthermore, from the fact that the pair of tool side cores 126 have mutually equal diameter dimensions, it is possible to use the same standard core members with an equal curvature as the partial cores 130 constituting the tool side core 126, and also, for the pair of main unit side cores 152 facing opposite this, it is possible to use the same standard core members, so it is possible to reduce the types of core members to be prepared, and to reduce the manufacturing cost. In addition, by attaching the disk 122 to the rotation axis 116, it is possible to attach to the rotation axis 116 of the pair of tool side coil units 118, so it is possible to reduce time and effort for manufacturing. Also, for example, when the main unit side core 152 is a ring shape continuous around the entire circumference, the same as with the tool side core 126, it is necessary to push through and arrange the rotation axis 116, and it is necessary to consider the position for attaching the rotation axis 116, but with this embodiment, since the main unit side core 152 does not continue along the entire circumference, it is acceptable to arrange simply at a position facing opposite the tool side core 126, making design easier as well.

Then, from the fact that the tool side core 126 is constituted divided in the circumference direction by each partial core 130, it is possible to focus the magnetic flux on the open end surface 134 of each partial core 130, and compared to when providing core members continuously on the entire circumference of the tool side core 126, it is possible to inhibit dispersion of the magnetic flux. By doing this, it is possible to perform higher reliability transmission. Furthermore, with this embodiment, by having the partial cores 130 covered by the cover member 136, it is possible to inhibit magnetic flux leakage from the partial cores 130, and it is possible to more effectively focus the magnetic flux on the open end surface 134. Also, the voltage flowing to the tool side coil 128 is converted to heat or the like within the core member as the frequency becomes higher and attenuation occurs more easily, but with this embodiment, the tool side core 126 is divided in the circumference direction, and by making the circumference direction length in which the core exists be smaller, it is possible to reduce this attenuation as well.

In addition, with this embodiment, the electromagnetic shielding mechanism is constituted by the disk 122, the pad 148, and the shield member 170, and there is a reduction of the risk of the magnetic lines of force leaking from the tool side core 126 and the main unit side core 152 affecting other electronic parts, and of the magnetic force lines from the other electronic parts affecting the electromagnetic inductance effect of the tool side core 126 and the main unit side core 152. In particular with the tool side coil unit 118 and the main unit side coil unit 120, the disk 122 and the pad 148 itself are formed using electromagnetic shielding members, and it is unnecessary to specially provide an electromagnetic shielding member, so it is possible to reduce the number of parts. Furthermore, specifically with this embodiment, by interposing the cover member 136 between the tool side core 126 and the disk 122, and between the main unit side core 152 and the pad 148, there is a reduction in the risk of a decrease in absorption of the electromagnetic energy of the tool side core 126 and the main unit side core 152 by the disk 122 and the pad 148, and it is possible to perform more stable transmission.

Figure 11:
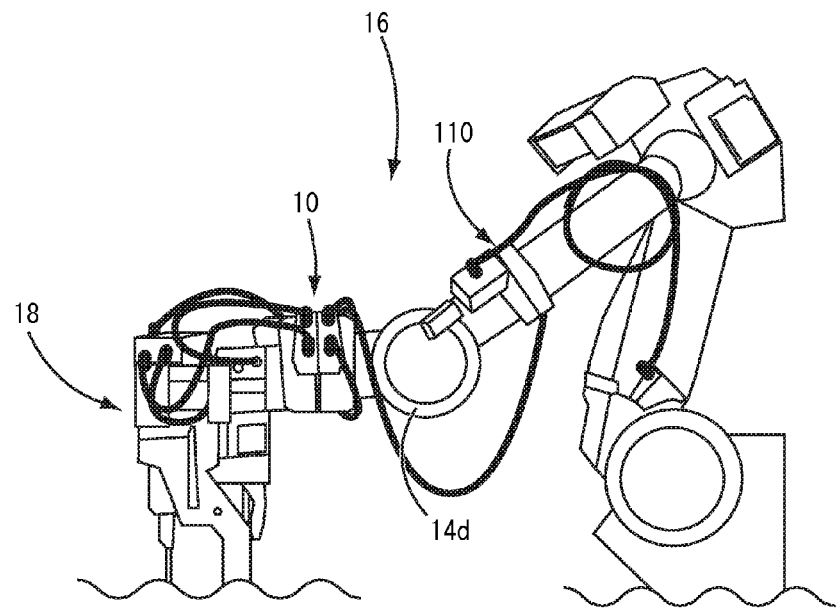
FIG. 11 is a left side view of key parts of the robot produced using a constitution according to the embodiment shown in FIG. 1.
Figure 12:
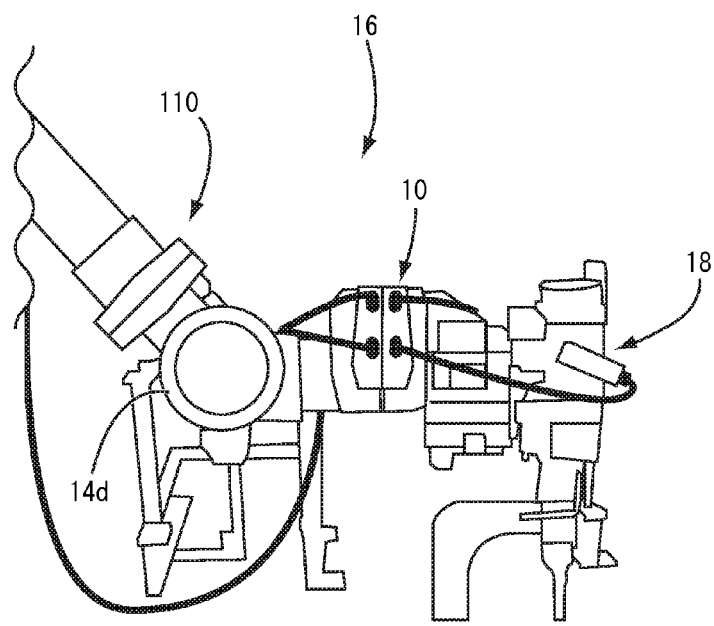
FIG. 12 is a right side view of the key parts of the robot shown in FIG. 11.

Incidentally, we actually produced a robot equipped with the automatic tool exchange device with a constitution according to the embodiment described above as shown in FIGS. 11 and 12, and confirmed its operation. As a result, even in a situation installed with an actual operating environment roughly reproduced, this robot operates stably with high precision, and for the various effects as described above, it was possible to confirm that all the effects could be exhibited.

Above, we gave a detailed description regarding an embodiment of the present invention, but this is nothing more than an example, and the present invention is not to be interpreted in any limiting way at all by the specific notations of this embodiment. Note that with the description hereafter, for members and sites with the same constitution as the aforementioned embodiment, by giving the same code number in the drawings as the embodiment noted above, detailed descriptions of those are omitted.

For example, with the aforementioned tool changer 10, by the primary side coil unit 44 being energized in a projecting state from the module main unit 71, the end surfaces 60 of both core members 54 provided on both coil units 44 and 80 are always in a contact state, but it is not absolutely necessary to always maintain a contact state for the end surfaces 60 of both core members 54, and it is also acceptable to always have a separation of a specified distance and have a non-contact state, and for example it is also acceptable to have the arm member 16 move at high speed and to make the separation distance of both modules 30a and 30b be temporarily larger and to temporarily separate them, or the like. Then, even in a case when the end surfaces 60 of both core members 54 are mutually separated, with both coil units 44 and 80 constituted according to the present invention, by providing a gap member 56 on the outer circumference except for the end surface 60 of the core member 54, it is possible to focus the magnetic flux on the end surface 60 of the core member 54, and it is possible to perform more stable transmission. Therefore, for example with the aforementioned embodiment, the coil spring 76 or holder 70 or the like that make the primary side coil unit 44 project are not absolutely necessary, and with the signal feed module 30a as well, it is also acceptable to provide the primary side coil unit 44 in a fixed manner on the module main unit 71 or the like.

Figure 13:
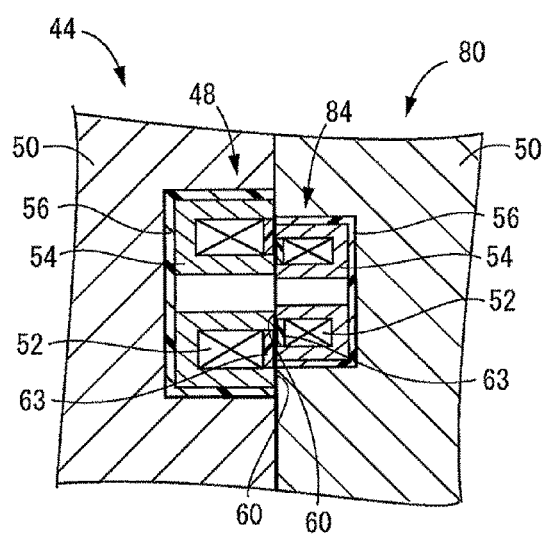
FIG. 13 is a cross section view showing a different mode of a core member provided in a module for an automatic tool exchange device.

Also, as shown in model form as an example in FIG. 13 with the primary side coil head for signals 48 and the secondary side coil head for signals 84 with the aforementioned tool changer 10, the diameter dimensions of one of the core members 54 (in FIG. 13, the primary side coil head for signals 48) can also be made larger than the diameter dimensions of the other core member 54 (in FIG. 13, the secondary side coil head for signals 84). By working in this way, even in a case when skew occurs in the axis direction (in FIG. 13, the vertical direction) between both core members 54, it is possible to maintain a higher level of the mutually opposite facing state of the end surfaces 60, and it is possible to perform higher reliability transmission. In light of this, more preferably, for the diameter dimensions of one of the core members 54 (in FIG. 13, the primary side coil head for signals 48), compared to the diameter dimensions of the other of the core members 54 (in FIG. 13, the secondary side coil head for signals 84), this is preferably made bigger than the maximum displacement volume of the direction orthogonal to the opposite facing direction (in FIG. 13, the vertical direction) between both signal feed modules 30a and 30b. By working in this way, it is possible to always maintain the opposite facing state of both end surfaces 60.

Figure 14:
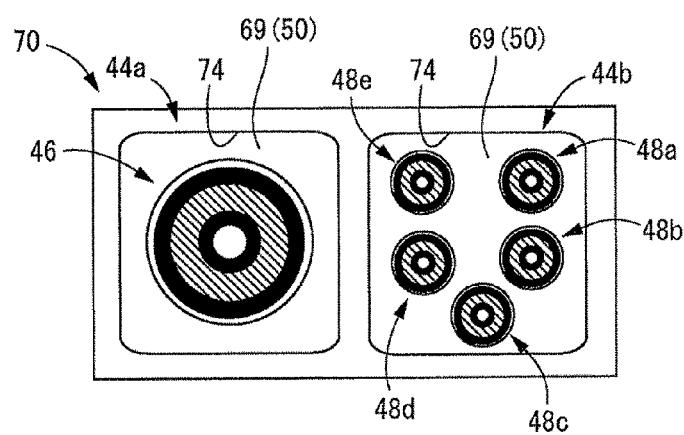
FIG. 14 is a view showing a different mode of the coil unit provided on the module for an automatic tool exchange device.

Also, one coil unit 44 and 80 is provided respectively at both signal feed modules 30a and 30b with the aforementioned tool changer 10, but as shown in model form in FIG. 14, for example, it is also possible to provide a plurality of coil units on one module. Two unit push through holes 74 are formed on the holder 70 in FIG. 14, and the coil units 44a and 44b are arranged in a projecting state respectively on the unit push through holes 74. Then, while the primary side coil head for power 46 is provided on the coil unit 44a, the primary side coil heads for signals 48a through 48e are provided on the coil unit 44b. Of course, it is also possible to provide a plurality of coil units on one module without going via the holder 70 or the like. Also, as is clear from FIG. 14, it goes without saying that the arrangement mode of the coil heads is not limited in any way.

Furthermore, with the aforementioned tool changer 10, it is of course also possible to for example remove the primary side coil head for power 46 and the secondary side coil head for power 82, and to perform only electrical signal transmission using the primary side coil heads for signals 48a through 48e and the secondary side coil heads for signals 84a through 84e or the like.

Figure 15:
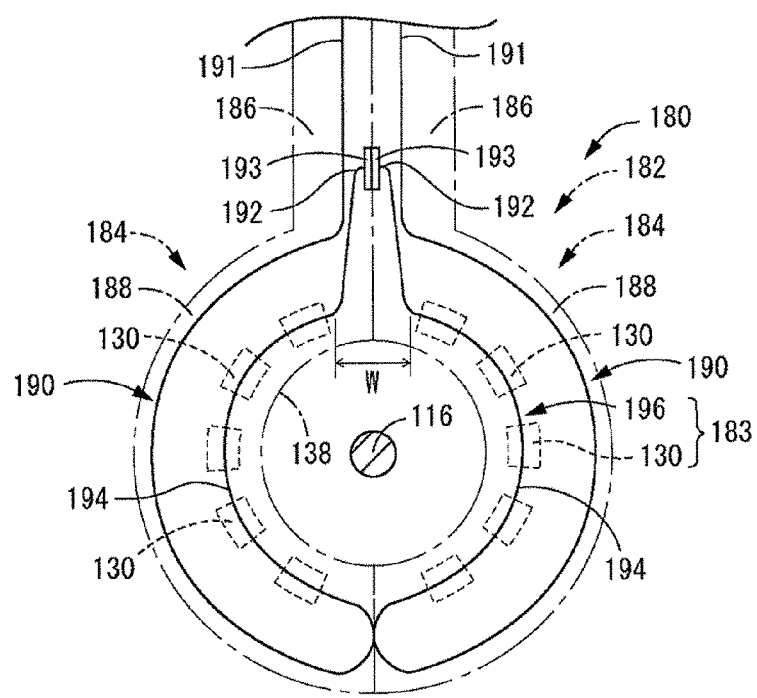
FIG. 15 is a view showing a different mode of the first coil unit used for the harnessless device.

Also, FIG. 15 shows in model form a tool side coil unit 180 as a different mode of the first coil unit with the previously described harnessless device. The tool side coil unit 180 is constituted with a tool side coil head 183 provided as the coil head on a disk 182 as the first support member. In light of this, the disk 182 of this embodiment has a divided constitution, and is constituted with a pair of partial disks 184 as the partial support member being coupled by being fitted to each other or the like.

The partial disk 184 has a pillar shaped part 186 extended straight, and also, at one end part of the pillar shaped part 186 there is a ring shaped part 188 with a semicircular ring shape. Note that the partial disk 184, the same as with the aforementioned disk 122, is a high shielding effect member formed from a member such as the previously noted example with a high electromagnetic shield effect or the like. Then, within the respective partial disks 184 are arranged lead wires 190 formed using for example copper or the like. The lead wire 190 of this mode, after being extended straight from a base tip 191 along the pillar shaped part 186 within the pillar shaped part 186, is extended along the ring shaped part 188 at the outside part within the ring shaped part 188. Furthermore, the lead wire 190, after being bent toward the inside of the ring shaped part 188 at the extended tip part of the ring shaped part 188, is extended toward the pillar shaped part 186 along the ring shaped part 188 at the inside part within the ring shaped part 188, and an extended tip 192 is electrically connected with a connector 193 provided at a site positioned facing opposite the other partial disk 184 at the pillar shaped part 186 of the partial disk 184. In other words, the lead wire 190 is bent and folded at the extended tip part of the ring shaped part 188, and is arranged along the ring shaped part 188 at the inside and the outside of the ring shaped part 188. Then, a roughly semicircle shaped coil forming part 194 is formed by the lead wire 190 arranged inside the ring shaped part 188, and a plurality of partial cores 130 are combined on that coil forming part 194.

A pair of partial disks 184 with this kind of constitution is coupled by being fitted to each other so that the rotation axis 116 is enclosed by the ring shaped part 188. In this coupled state, the connectors 193 of the pair of partial disks 184 are connected to each other, and the extended tips 192 of the pair of lead wires 190 are electrically connected in series to each other, and a tool side coil 196 is formed as the first coil member having a roughly circular shape overall by the pair of coil forming parts 194. By doing this, the tool side coil head 183 for which the tool side coil 196 is combined with the partial core 130 is constituted. Furthermore, the disk 182 as the first support member supporting the tool side coil head 183 is constituted by the pair of partial disks 184, and the axis insertion push through hole 138 in which the rotation axis 116 is pushed through is formed by the inner circumference surface of the pair of ring shaped parts 188.

By working in this way, by the pair of partial disks 184 sandwiching the rotation axis 116 being coupled to each other, it is possible to form the disk 182 and the tool side coil head 183 coming out from the rotation axis 116. By doing this, for example it is possible to easily attach the tool side coil head 183 to already existing robots and the like, and it is also easy to apply the harnessless device to existing robots and the like.

Note that specifically with the partial disk 184 shown in FIG. 15, by positioning the connector 193 at the extended tip 192 of the pillar shaped part 186 taking into consideration the ease of mutual coupling and the like, a specified gap: W is formed between the pair of coil forming parts 194, but this gap: W is preferably as small as possible. In light of this, it is also possible to position the connector 193 closer to the inner circumference surface of the ring shaped part 188 for example, to make the gap: W smaller, and the like.

Figure 16A:
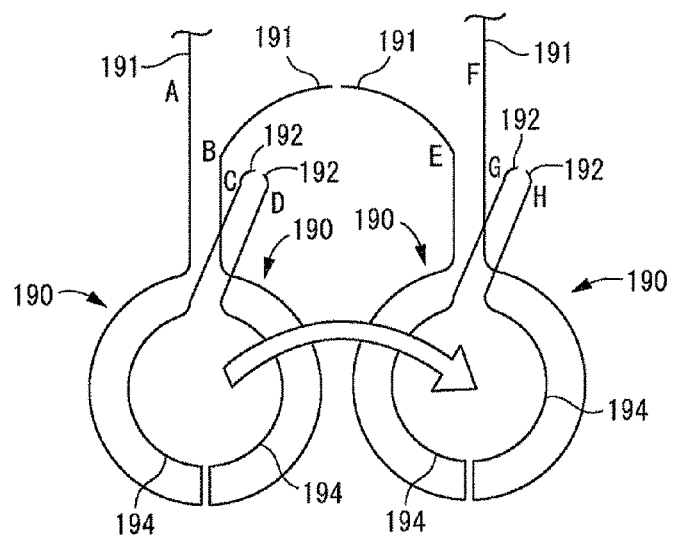
FIGS. 16A and 16B are views showing yet a different mode of the same first coil unit.
Figure 16B:
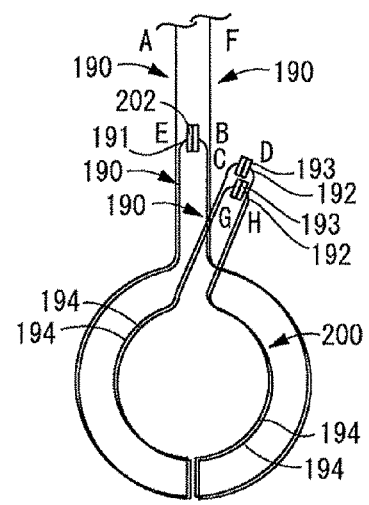

Also, in FIG. 15, to make it easier to understand, an example was shown of the winding count being one coil as the tool side coil 196, but as with a tool side coil 200 as yet a different mode of the coil member shown in model form in FIGS. 16A and 16B, for example, it is also possible to constitute the coil having a plurality of wind counts to be able to be divided in the circumference direction. To constitute this kind of tool side coil 200, for example first, as shown in FIG. 16A, by preparing four of the lead wires 190 shown in the FIG. 15 and combining one pair each, two circular shapes are formed by the pair of coil forming parts 194 shown in FIG. 15. Then, the lead wires 190 are connected in series. In specific terms, the same as with the tool side coil 196 shown in FIG. 15, the extended tip 192 of the pair of lead wires 190 forming the circular shape by the coil forming parts 194 working together are connected to each other by the connector 193.

Then, the base tip 191 of one of the pair of lead wires 190 forming a circular shape by the coil forming part 194 and the base tip 191 of the other of the pair of lead wires 190 forming a circular shape are connected to each other by a connector 202.

By doing this, the four lead wires 190 are connected in series, and two circular shapes are formed by the coil forming parts 194 on the current transmission path. Then, the two circular shapes by the coil forming parts 194 are overlapped with each other so that the current direction is equal with the axis direction view (in FIGS. 16A and 16B, the direction perpendicular to the paper surface). In specific terms, the sites positioned at "A" through "H" shown in FIG. 16A are respectively positioned at "A" through "H" in FIG. 16B. By working in this way, it is possible to obtain a tool side coil 200 which can be divided in the circumference direction by the connector 193 and the connector 202, and which is wound on the partial core 130 a plurality of times. Note that the tool side coil 200 shown in FIGS. 16A and 16B is a coil with a winding count of 2, but in cases of consisting a coil that can be divided in the circumference direction and having a larger number of winds, similarly, it is also possible to form a yet higher number of circular shapes by the pair of coil forming parts 194 by connecting yet a higher number of lead wires 190 in series, and to overlap the circular shapes so that the current direction is equal with the axis direction view. Also, in FIG. 16B, to make it easy to understand, the connectors 193 and 202 are provided for the mutually connected extended tips 192 and the base tips 191 respectively, but it is of course also possible to constitute the connectors 193 and 202 with just one connector.

Figure 17:
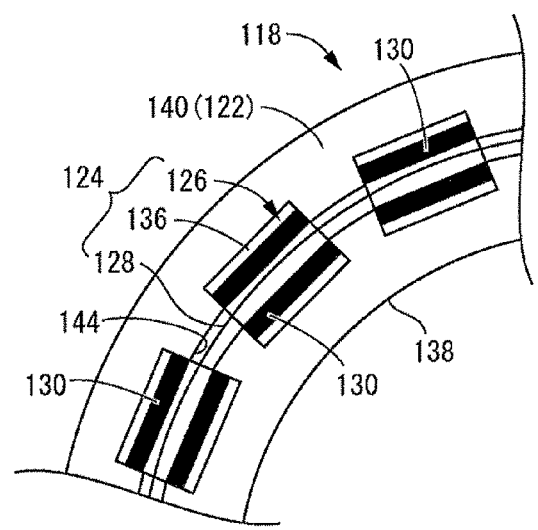
FIG. 17 is a front view showing a different mode of a partial core member used for the harnessless device.

Furthermore, there is no particular restriction on the specific shape of the partial core member constituting the first core member and on the second core member. For example, as shown in model form in FIG. 17, it is also possible to use an item that extends in a straight line form as the partial core 130. Furthermore, the partial core member and the second core member are not limited to having a cross section in a U shape, but can also suitably use for example an E shaped or an I shaped item. In addition, the partial core member does not necessarily have to be arranged separated by equal gaps in the circumference direction of the first core member, and it is also possible to have differing separation distances between the partial core members. In that case, the second core member facing opposite the partial core member, so as to be facing opposite at least one partial core member at any circumference direction position, is set to a circumference direction length greater than the maximum item among the circumference direction separation distances of the plurality of partial core members.

Also, the arrangement position and the opposite facing direction of the first core member and the second core member can be changed as appropriate. A number of suitable examples are shown in model form in FIG. 18 through FIG. 22, but it should be understood that this does not indicate that the arrangement mode of the first core member and the second core member are limited to these.

Figure 18:
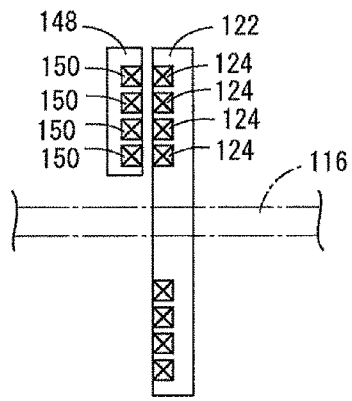
FIG. 18 is a view showing a different arrangement mode of a first coil head and a second coil head used for the harnessless device.

First, in FIG. 18, at one surface of the disk 122, while the four tool side coil heads 124 with mutually different diameter dimensions are provided on a concentric axis, on the pad 148, the four main unit side coil heads 150 are provided corresponding to these four tool side coil heads 124. By working in this way, one disk 122 and one pad 148 can constitute four transmission paths. Note that when providing the tool side coil head 124 on only one surface of the disk 122, as with the aforementioned pad 148 and the main unit side coil head 150 shown in FIG. 10, preferably the thickness dimensions of the disk 122 and the height dimensions of the tool side coil head 124 (in FIG. 10, the lateral direction dimensions) are equal, and through holes are formed penetrating in the thickness direction of the disk 122, and also, the tool side coil head 124 is inserted and fixed in this through hole. By working in this way, it is possible to easily align the open end surface 134 of the partial core 130 on the end surface 140 of the disk 122.

Figure 19:
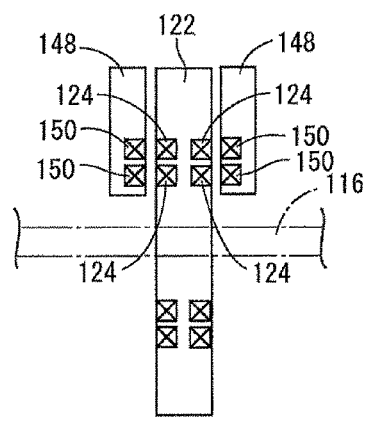
FIG. 19 is a view showing yet a different arrangement mode of the first coil head and the second coil head used for the harnessless device.

Also, in FIG. 19, while at both surfaces of the disk 122, two tool side coil heads 124 with differing diameter dimensions to each other are arranged on a concentric axis, and a total of four tool side coil heads 124 are provided, on the pair of pads 148 are respectively provided with two main unit side coil heads 150 corresponding to the two tool side coil heads 124 provided on one surface of the disk 122. Then, these pairs of pads 148 and disks 122 are positioned facing opposite with a specified distance separated in the axis direction of the rotation axis 116. By working in this way, it is possible to make the diameter dimensions of the disk 122 smaller.

Figure 20:
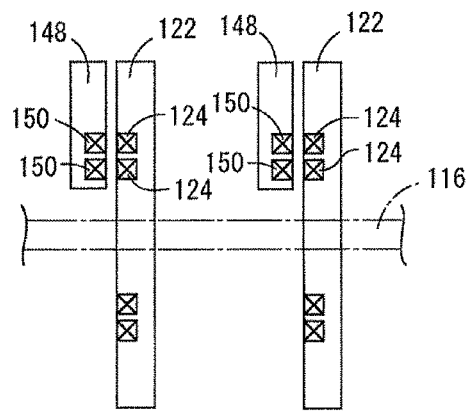
FIG. 20 is a view showing yet a different arrangement mode of the first coil head and the second coil head used for the harnessless device.
Figure 21:
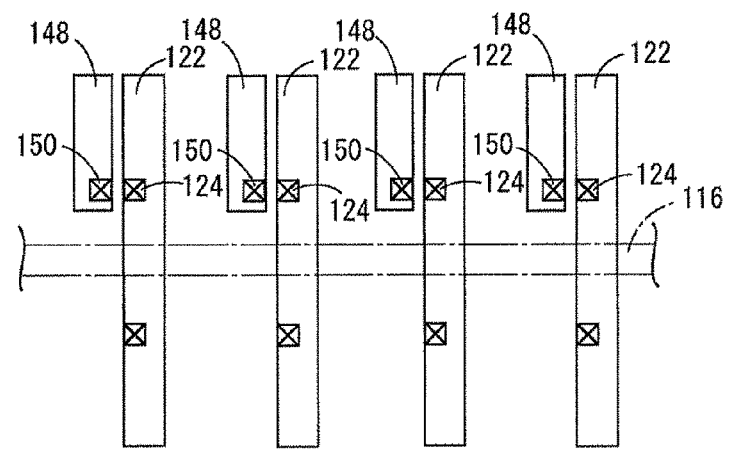
FIG. 21 is a view showing yet a different arrangement mode of the first coil head and the second coil head used for the harnessless device.
Figure 22:
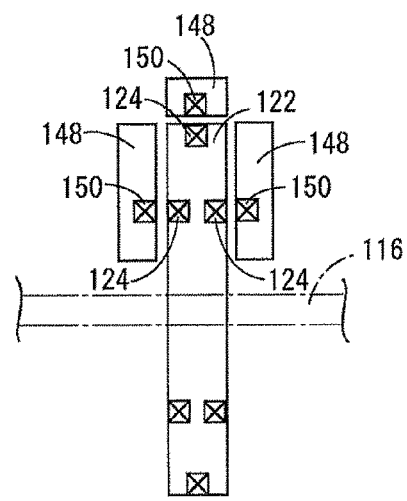
FIG. 22 is a view showing yet a different arrangement mode of the first coil head and the second coil head used for the harnessless device.

Furthermore, in FIG. 20, on one surface, aligned in the axis direction of the rotation axis 116 are provided two sets of a set of the disk 122 for which two tool side coil heads 124 with mutually different diameter dimensions are provided on a concentric axis, and the pad 148 on which are provided two main unit side coil heads 150 corresponding to these two tool side coil heads 124. Furthermore, in FIG. 21, four sets of a set of the disk 122 equipped with one tool side coil head 124 and the pad 148 corresponding to that tool side coil head 124 are arranged aligned in the axis direction of the rotation axis 116. With these constitutions as well, it is possible to constitute a total of four transmission paths.

Note that the opposite facing direction of the first coil head and the second coil head is not only the rotation center axis direction of the rotation axis, but can also be a direction such as that orthogonal to the rotation center axis direction of the rotation axis. For example, on the disk 122 in FIG. 22, respectively at both surfaces of the axis direction of the rotation axis 116, one each of the tool side coil head 124 is provided, and also, at the end surface of the direction orthogonal to the axis direction of the rotation axis 116, in other words, the outer circumference surface of the disk 122 (in FIG. 22, the vertical direction end surface) is further provided another tool side coil head 124. The partial core 130 of the tool side coil head 124 provided on the outer circumference surface of this disk 122 has its open end surface 134 arranged facing the outside of the disk 122 in the direction orthogonal to the axis direction of the rotation axis 116.

Then, respectively at each pad 148 are provided main unit side coil heads 150 corresponding respectively to the tool side coil heads 124 provided at both surfaces of the disk 122, and the pair of pads 148 are positioned facing opposite each other sandwiching the disk 122 with a specified distance separated in the axis direction of the rotation axis 116. Furthermore, the pad 148 equipped with the main unit side coil head 150 corresponding to the tool side coil head 124 provided on the outer circumference surface of the disk 122 is positioned facing opposite the disk 122 with a specified distance separated in the direction orthogonal to the axis direction of the rotation axis 116. Note that the main unit side core 152 of the pad 148 positioned facing opposite the disk 122 in the direction orthogonal to the axis direction of the rotation axis 116 is arranged with its open end surface 158 in a state facing the disk 122 in the direction orthogonal to the axis direction of the rotation axis 116, and the open end surface 158 is positioned facing opposite with a specific distance separated in the direction orthogonal to the axis direction of the rotation axis 116 in relation to the open end surface 134 of the partial core 130 provided on the outer circumference surface of the disk 122.

By doing this, a total of three transmission paths are constituted by a set of the pair of tool side coil heads 124 and the main unit side coil heads 150 positioned facing opposite in the axis direction of the rotation axis 116, and a set of one of the tool side coil head 124 and the main unit side coil head 150 positioned facing opposite in the direction orthogonal to the axis direction of the rotation axis 116. Note that it is of course possible to have a plurality of the tool side coil heads 124 aligned in the axis direction of the rotation axis 116 on the outer circumference surface of the disk 122.

Also, the main unit side core 152 as the second core member shown with the aforementioned embodiment was in a shape without being continuous on the entire circumference, but it is also possible to have the second core member be a ring shape continuous along the entire circumference.

Furthermore, the first support member does not absolutely have to be coupled to the rotation axis, but can also be directly fixed to the first member. For example, with the embodiment described above, it is also possible to have the disk 122 fixed directly to the tool side arm member 112. Furthermore, for example, it is also possible to form as a single unit the flange shaped part extending in the direction orthogonal to the rotation center axis on the first member, and to use that flange shaped part as the first support member or the like so as to form as a single unit the first support member on the first member or the like, and for the second support member as well, it is possible to form as a single unit with the second member.

Also, using the harnessless device, instead of or in addition to the aforementioned electrical signals, it is also possible to transmit power or the like. For example, the movable type transformer 110 according to the aforementioned embodiment includes two sets of the tool side coil unit 118 and the main unit side coil unit 120 set, so that it is also possible to perform transmission of power using one set of those. By working in this way, it is possible to transmit electrical signals and power between the tool side arm member 112 and the main unit side arm member 114 without using a cable, and for example it is possible to constitute a power supply path using the movable type transformer 110 in addition to the signal delivery path for apparatuses driven by relatively small power such as position sensors and the like.

In addition, though each item is not listed, the present invention can be implemented in modes with various modifications, revisions, and amendments added based on the knowledge of a person skilled in the art, and it goes without saying that any of that kind of embodiment is included in the scope of the present invention as long as it does not stray from the gist of the present invention.

22: Robot side adapter, 24: Tool side adapter, 30: Signal feed module, 44: Primary side coil unit, 46: Primary side coil head for power, 48*a* to *e*: Primary side coil heads for signals, 50: Case, 52: Coil member, 54: Core member, 56: Gap member, 60: End surface, 80: Secondary side coil unit, 82: Secondary side coil head for power, 84*a* to *e*: Secondary side coil heads for signals

The invention claimed is:

1. A module for an automatic tool exchange device, the automatic tool exchange device having a first coupling member configured to attach to one of a robot main unit side and a tool side and a second coupling member configured to attach to the other one of the robot main unit side and the tool side, the first and second coupling members configured for detachable coupling to each other, the module comprising:

a first module detachably attached to the first coupling member; and a second module detachably attached to the second coupling member, for transmitting electrical signals between the first coupling member and the second coupling member by permitting transmission of electrical signals between the first module and the second module, wherein the first and second modules each have a coil unit including at least one coil head and an electromagnetic shielding member, wherein the coil heads comprise a core member in combination with a coil member, a transmission surface including a magnetic path open surface being formed by the core member, the electromagnetic shielding member arranged on an outer circumference of the core member exclusive of the transmission surface, the coil head further including a gap member being interposed between the core member and the electromagnetic shielding member, the gap member having a lower electromagnetic shielding effect than the electromagnetic shielding member, wherein the transmission surfaces of the core members face opposite each other to define an opposite facing type interface for performing transmission of electrical signals using an electromagnetic induction effect, and one of the coil units on the opposite facing type interface is attached to the first module and another one of the coil units is attached to the second module such that the first module and the second module are configured to permit transmission of electrical signals therebetween.

2. The module for an automatic tool exchange device according to claim 1, wherein the core member has a round cylinder shape having a circumference groove that opens in one axis direction, and wherein the coil member is arranged inside the circumference groove such that the transmission surface includes an open side end surface of the circumference groove.

3. The module for an automatic tool exchange device according to claim 1, wherein the transmission surfaces for the coil units are in contact with each other when the first coupling member and the second coupling member are in a coupled state.

4. The module for an automatic tool exchange device according to claim 1, wherein one of the coil units is fixed to one of the first module and the second module, and the other one of the coil units is coupled, via an elastic support member to be able to be displaced along a specified range, in an opposite facing direction of the coil units in relation, to the other one of the first module and the second module.

5. The module for an automatic tool exchange device according to claim 4, wherein the elastic support member comprises an energizing member energizing the coil unit and provided on one of the first module and the second module in a state projecting toward the other one of the first module and the second module.

6. The module for an automatic tool exchange device according to claim 5, wherein a maximum projecting volume of the coil unit made to project by the energizing member is larger than a maximum separation volume of the first module and the second module in the opposite facing direction of the coil units.

7. The module for an automatic tool exchange device according to claim 5, wherein the energizing member comprises a coil spring that applies energizing force to the coil unit, and a locking part that locks the coil unit and blocks detachment of the coil unit from the first module or the second module.

8. The module for an automatic tool exchange device according to claim 7, wherein the module further comprises a holder that holds the coil unit, the energizing member for applying energizing force to the coil unit using a restoration force of the coil spring by pushing through the coil spring inside the holder from an opening part opened to a side opposite the transmission surface of the coil unit at the holder, and by compression deforming the coil spring between a lid member that plugs the opening part and the coil unit.

9. The module for an automatic tool exchange device according to claim 1, wherein one of the transmission surfaces of the coil units is larger than another one of the transmission surfaces in a direction orthogonal to the direction facing opposite the other one of the transmission surfaces.

10. The module for an automatic tool exchange device according to claim 9, wherein one of the transmission surfaces of the coil units is larger than a maximum displacement volume between the first module and the second module in the direction orthogonal to the opposite facing direction of the coil units.

11. The module for an automatic tool exchange device according to claim 1, wherein the coil unit of each of the first module and second module comprises a plurality of coil heads.

12. The module for an automatic tool exchange device according to claim 1, wherein the respective first module and second module comprise additional coil units, such that the at least one coil head comprises a plurality of coil heads.

13. The module for an automatic tool exchange device according to claim 11, wherein the module is configured to transmit power in addition to the electrical signals, and the plurality of coil heads include a coil head for transmitting power and a coil head for transmitting signals.

14. The module for an automatic tool exchange device according to claim 13, wherein the transmission surface of the coil head for transmitting power is larger than the transmission surface of the coil head for transmitting signals.

15. The module for an automatic tool exchange device according to claim 1, wherein the module is configured to transmit power in addition to electrical signals.

16. The module for an automatic tool exchange device according to claim 1, wherein the electrical signals comprise at least one of a sensor signal, an encoder signal, and a serial signal.

17. The module for an automatic tool exchange device according to claim 1, wherein the electromagnetic shielding member is formed from at least one of aluminum, copper, iron, nickel, magnetite, gadolinium, cobalt, a ferrimagnetic body, a conductive powder material, and a conductive coating material.

18. The module for an automatic tool exchange device according to claim 1, wherein the gap member is formed from at least one of polytetrafluoroethylene, epoxy resin, plastic, wood, paper, cloth, a nonconductive coating material, reinforced plastic, glass, natural resin, and synthetic resin.

19. An automatic tool exchange device having a first coupling member configured to attach to one of a robot main body side and a tool side and a second coupling member configured to attach to the other one of the robot main body side and the tool side, the first and second coupling members configured for detachable coupling to each other, the device having a module comprising:
a first module detachably attached to the first coupling member; and
a second module detachably attached to the second coupling member, for transmitting electrical signals between the first coupling member and the second coupling member by permitting transmission of electrical signals between the first module and the second module,
wherein the first and second modules each have a coil unit including a coil head and an electromagnetic shielding member, wherein the coil heads comprise a core member in combination with a coil member, a transmission surface including a magnetic path open surface being formed by the core member, the electromagnetic shielding member arranged on an outer circumference of the core member exclusive of the transmission surface, the coil head further including a gap member being interposed between the core member and the electromagnetic shielding member, the gap member having a lower electromagnetic shielding effect than the electromagnetic shielding member, wherein the transmission surfaces of the core members face opposite each other to define an opposite facing type interface for performing transmission of electrical signals using an electromagnetic induction effect, and one of the coil units on the opposite facing type interface is attached to the first module and another one of the coil units is attached to the second module such that the first module and the second module are configured to permit transmission of electrical signals therebetween.

20. A robot with an automatic tool exchange device, the automatic tool exchange device having a first coupling member configured to attach to one of a robot main body side and a tool side and a second coupling member configured to attach to the other one of the robot main body side and the tool side, the first and second coupling members configured for detachable coupling to each other, the device having a module comprising:
a first module detachably attached to the first coupling member; and
a second module detachably attached to the second coupling member, for transmitting electrical signals between the first coupling member and the second coupling member by permitting transmission of electrical signals between the first module and the second module,
wherein the first and second modules each have a coil unit including a coil head and an electromagnetic shielding member, wherein the coil heads comprise a core member in combination with a coil member, a transmission surface including a magnetic path open surface being formed by the core member, the electromagnetic shielding member arranged on an outer circumference of the core member exclusive of the transmission surface, the coil head further including a gap member being interposed between the core member and the electromagnetic shielding member, the gap member having a lower electromagnetic shielding effect than the electromagnetic shielding member, wherein the transmission surfaces of the core members face opposite each other to define an opposite facing type interface for performing transmission of electrical signals using an electromagnetic induction effect, and one of the coil units on the opposite facing type interface is attached to the first module and another one of the coil units is attached to the second module such that the first module and the second module are configured to permit transmission of electrical signals therebetween.

21. The robot according to claim 20, further comprising:
a first member and a second member coupled by a rotation axis and configured to rotate relative to each other around the rotation axis; and a harnessless device including at least one first coil unit attached to the first member and at least one second coil unit attached to the second member, wherein:

the first coil unit includes a first core member including a plurality of partial core members being arranged mutually separated on a circumference, and at least one first coil head including a first coil member extending on the circumference on which the plurality of partial core members are arranged and being attached to the first core member, wherein a first transmission surface including a magnetic path open surface being formed by the partial core member at the first coil head, the first coil head being supported on the first support member such that the first coil unit having the plurality of the partial core members is arranged in a circular form on a first support member;

the second coil unit includes a second core member having a circumference direction length greater than a maximum value of a circumference direction separation distance of the partial core members adjacent in the circumference direction at the first core member, and at least one second coil head including a second coil member attached to the second core member, wherein a second transmission surface including a magnetic path open surface being formed by the second core member at the second coil head, the second coil unit being having the second coil head supported by a second support member, wherein the first coil unit is attached to the first member with the first core member positioned coaxially with a rotation center axis of the rotation axis, and the second coil unit is attached to the second member, such that the second transmission surface at the second core member is positioned facing opposite the first transmission surface at the first core member such that the first and second members are configured to rotate relative to each other around the rotation center axis with a defined distance between the first and second members, the second core member, at any position on the circumference, being arranged so as to be in an opposite facing state in relation to at least one of the plurality of partial core members such that electrical signal transmission is provided using the electromagnetic induction between the first coil head and the second coil head.

22. The robot according to claim 21, wherein the second core member is shaped to extend partially in the circumference direction of the first core member.

23. The robot according to claim 21, wherein a circumference direction length of the plurality of partial core members are equal to each other, and the first core member includes the plurality of partial core members being arranged separated by an equal distance in the circumference direction on a concentric circle.

24. The robot according to claim 21, wherein the plurality of partial core members are in an arc shape having mutually equal curvatures, and the second core member is shaped to extend in the circumference direction having an equal curvature to the partial core member.

25. The robot according to claim 21, wherein a dimension of the first coil head in a direction facing opposite the second core member is equal to a thickness dimension of the first support member in the direction facing opposite the second core member, and at the first support member, the first coil head is attached in an inserted state inside a through hole penetrating in the direction facing opposite the second core member.

26. The robot according to claim 21, wherein a dimension of the second coil head in a direction facing opposite the first core member is equal to a thickness dimension of the second support member in the direction facing opposite the first core member, and at the second support member, the second coil head is attached in an inserted state inside a through hole penetrating in the direction facing opposite the first core member.

27. The robot according to claim 21, wherein the first support member comprises a plurality of partial support members extending partially in the circumference direction, and the first coil member includes lead wires on each of the partial support members, the partial support members being connected to each other.

28. The robot according to claim 27, wherein the first support member includes a pair of the partial support members having a semicircle shape, and at the respective partial support members, coil forming parts extending in the circumference direction of the partial support member are formed at the lead wires, and the partial core member is combined with the coil forming part, and the lead wire bent back at one end part of the circumference direction of the partial support member to connect the lead wire on one of the partial support members to the lead wire on another of the partial support members at another end part, the first coil member including each of the coil forming parts with the partial support members in a combined state.

29. The robot according to claim 21, wherein the first transmission surface at the first core member and the second transmission surface at the second core member are positioned facing opposite in an axis direction of the rotation center axis.

30. The robot according to claim 21, wherein the first transmission surface at the first core member and the second transmission surface at the second core member are positioned facing opposite in a direction orthogonal to an axis direction of the rotation center axis.

31. The robot according to claim 21, further comprising a high shielding effect member having a high electromagnetic shielding effect, wherein the high shielding effect member is arranged at an outer circumference of at least at one of the first core member and the second core member, exclusive of the first transmission surface or the second transmission surface.

32. The robot according to claim 31, wherein at least one of the first support member and the second support member is the high shielding effect member.

33. The robot according to claim 21, wherein the first coil unit and the second coil unit are covered by a high shielding effect member having a high electromagnetic shielding effect.

34. The robot according to claim 31, wherein the high shielding effect member is formed from at least one of aluminum, copper, iron, nickel, magnetite, gadolinium, cobalt, a ferrimagnetic body, a conductive powder material, and a conductive coating material.

35. The robot according to claim 21, further comprising a low shielding effect member having a low electromagnetic shielding effect, wherein the low shielding effect member is arranged at an outer circumference of at least at one of the first core member and the second core member exclusive of the first transmission surface or the second transmission surface.

36. The robot according to claim 35, further comprising a high shielding effect member having a high electromagnetic shielding effect, wherein the high shielding effect member is arranged at the outer circumference at least at one of the first core member and the second core member, exclusive of the first transmission surface or the second transmission surface, and the low shielding effect member is arranged between the outer circumference of the core member and the high shielding effect member.

37. The robot according to claim 35, wherein the low shielding effect member is formed from at least one of polytetrafluoroethylene, epoxy resin, plastic, wood, paper, cloth, a nonconductive coating material, reinforced plastic, glass, natural resin, and synthetic resin.

38. The robot according to claim 21, wherein a plurality of sets comprise the first coil unit and the second coil unit.

39. The robot according to claim 38, wherein the at least one first coil head comprises a plurality of first coil heads, and the at least one first coil unit comprises a plurality of first coil units that form a single unit by providing the plurality of first coil heads in concentric form on the first support member.

40. The robot according to claim 39, wherein a pair of the first coil heads have mutually equal diameter dimensions and are respectively arranged on both end parts of an axis direction of the rotation center axis at the first support member attached to the first member, and the at least one second coil head comprises a pair of second coil heads corresponding to the first coil heads and are arranged at sides facing opposite each other, sandwiching the first support member in the axis direction of the rotation center axis, and the first transmission surface at the first coil head and the second transmission surface at the second coil head are positioned facing opposite with a defined distance separated from each other in the axis direction of the rotation center axis.

41. The robot according to claim 21, wherein the robot is configured to transmit power in addition to the electrical signals using the harnessless device.

* * * * *